United States Patent
Scherzinger

(10) Patent No.: US 8,825,396 B2
(45) Date of Patent: Sep. 2, 2014

(54) QUASI TIGHTLY COUPLED GNSS-INS INTEGRATION PROCESS

(71) Applicant: Bruno M. Scherzinger, Richmond Hill (CA)

(72) Inventor: Bruno M. Scherzinger, Richmond Hill (CA)

(73) Assignee: Applanix Corporation, Richmond Hills, Ontario (CA)

(*) Notice: Subject to any disclaimer, the term of this patent is extended or adjusted under 35 U.S.C. 154(b) by 0 days.

(21) Appl. No.: 13/691,735

(22) Filed: Nov. 30, 2012

(65) Prior Publication Data

US 2014/0152493 A1 Jun. 5, 2014

(51) Int. Cl.
G01C 21/16 (2006.01)
G01S 19/39 (2010.01)
G01S 19/47 (2010.01)

(52) U.S. Cl.
CPC .............. G01S 19/47 (2013.01); G01C 21/165 (2013.01); G01S 19/39 (2013.01)
USPC ........... 701/469; 701/480; 701/500; 701/501; 342/357.21

(58) Field of Classification Search
CPC ....... G01C 21/165; G01S 19/40; G01S 19/45; G01S 19/47
See application file for complete search history.

(56) References Cited

U.S. PATENT DOCUMENTS

| | | | |
|---|---|---|---|
| 5,347,286 A | 9/1994 | Babitch | |
| 5,548,293 A | 8/1996 | Cohen | |
| 6,449,559 B2 | 9/2002 | Lin | |
| 6,753,810 B1 | 6/2004 | Yang et al. | |
| 6,834,234 B2 * | 12/2004 | Scherzinger et al. | 702/5 |
| 6,900,760 B2 * | 5/2005 | Groves | 342/357.65 |
| 7,328,104 B2 | 2/2008 | Overstreet | |
| 7,579,984 B2 * | 8/2009 | Wang et al. | 342/357.59 |
| 7,679,550 B2 | 3/2010 | Eichel et al. | |
| 7,876,266 B2 | 1/2011 | Rhoads | |
| 2003/0216865 A1 * | 11/2003 | Riewe et al. | 701/220 |
| 2010/0103033 A1 | 4/2010 | Roh | |

OTHER PUBLICATIONS

Syed et al.; "Improved Vehicle Navigation Using Aiding with Tightly Coupled Integration"; Vehicular Tech. Conf., 2008; IEEE; pp. 3077-3081; May 11-14, 2008.*

* cited by examiner

Primary Examiner — Michael J Zanelli
(74) Attorney, Agent, or Firm — James F. Kirk

(57) ABSTRACT

A quasi tightly coupled (QTC) aided INS (AINS) process has an inertial navigator system with a loosely-coupled AINS Kalman filter that constructs INS-GNSS position measurements, a GNSS position engine that computes a position fix from observables and an externally provided a priori position and position VCV matrix. An INS position seeding process in which the externally provided a priori position to the GNSS position engine is an antenna position computed from the INS position and attitude solution. An observable subspace constraint (OSC) process computes an OCS matrix that suppress the components of the GNSS position error due to a poor geometry in the GNSS position solution in the IG position measurement constructed by the AINS Kalman filter and that multiplies the OSC matrix and the IG position measurement and measurement model matrix to suppress uncorrected component of the GNSS position error in the IG position measurement and measurement model.

16 Claims, 5 Drawing Sheets

QUASI TIGHTLY COUPLED GNSS-INS INTEGRATION PROCESS

1.1 PRIORITY CLAIM

This invention claims priority from provisional patent application for A QUASI-TIGHTLY-COUPLED GNSS-INS INTEGRATION PROCESS filed on Nov. 30, 2011 and having Ser. No. 61/565,466.

1.2 FIELD OF THE INVENTION

This invention is related to the field of Inertial Navigation Systems aided with data from a Global Navigation Satellite System referred to as INS-GNSS systems. This application teaches how to make an INS-GNSS system that includes a quasi-tightly-coupled INS-GNSS integration process or method (QTC). The GNSS legend stands for Global Navigation Satellite System. This is the generic term for any satellite system used for positioning and navigation. Currently there are 4 national types of GNSS systems: the GPS (U.S.), GLONASS (Russia), Galileo (European Union) and the Compass system from (China).

1.3 OVERVIEW

A GNSS positioning algorithm is executed in a GNSS receiver to compute a position fix using a trilateration of measured ranges in the form of pseduoranges and carrier phases from the receiver antenna to each tracked satellite. Its use in a GNSS-aided INS requires, in principle, a loosely-coupled (LC) integration in which the aided INS AINS Kalman filter processes the GNSS position fix as a measurement. The known disadvantage of an LC integration is that the GNSS receiver cannot compute a position fix with fewer than 4 satellites and consequently the AINS Kalman filter cannot construct an INS-GNSS (IG) position measurement. The complete loss of aiding data during a partial outage of satellites allows the AINS errors to grow without the constraints imposed by GNSS aiding data By contrast, a tightly-coupled (TC) integration uses an AINS Kalman filter that processes the pseudoranges and possibly carrier phases generated by the rover GNSS receiver and possibly one or more base receivers at fixed and known locations as measurements. The salient advantage of a TC integration is that during a partial GNSS outage the AINS Kalman filter processes the available observables from fewer than the minimum 4 satellites that the GNSS receiver requires to compute a fully-constrained position fix. Consequently the AINS errors are partially constrained.

A QTC integration is an LC integration that exhibits the salient characteristics of a TC integration, these being
 continued aiding and partial position-time error regulation with fewer than 4 satellites, and
 rapid RTK/KAR recovery after recovery of 4 or more satellites.

The purpose of pursuing a QTC integration is to allow the integration of a GNSS positioning algorithm into a GNSS AINS with TC integration behavior with as few modifications as possible to the GNSS positioning algorithm. This is often desirable if the algorithm implementation in software is complex, mature and hence not easily modifiable. Such algorithms are often found on high performance GNSS receivers used for precision positioning and survey.

A typical GNSS positioning algorithm is a type of statistical position estimator. Its starting data comprises an a priori antenna position and a position variance-covariance (VCV) matrix. It performs a statistical estimation operation on successive epoch observables comprising pseudoranges and possibly carrier phases, and thereby computes an updated antenna position and VCV that is optimal according to an estimation cost function. The simplest example of such an estimator is a Gauss-Markov least-squares adjustment (LSA). More sophisticated examples include the Kalman filter and its many variants (extended Kalman filter, unscented Kalman filter), and Bayesian estimators.

QTC integration is achieved via two key mechanisms added to an LC integration:
 INS position seeding of the GNSS positioning algorithm.
 Observable subspace constraint on INS-GNSS position aiding.

The INS position seeding mechanization requires the a priori antenna position and position VCV in the GNSS positioning algorithm to be computed from the INS position and attitude (roll, pitch, heading) solution. This can be done by simple assignment, i.e. the a priori antenna position and VCV are set equal to the INS-derived antenna position and VCV. Alternatively the GNSS positioning algorithm treats the INS-derived antenna position and VCV as epoch measurements along with the GNSS observables. This causes the GNSS position estimator to adopt the INS-derived antenna position and VCV at a given epoch, which is approximately the same as assignment. Either approach is usually an easy modification to a GNSS positioning algorithm.

The observable subspace constraint on INS-GNSS position aiding comprises two steps. The basis vectors of the observable subspace in a 3-dimensioned position error space are computed. Then the LC IG position measurement in an AINS Kalman filter is constrained to lie in the observable subspace spanned by these vectors. The observable subspace basis vectors are obtained from the singular value decomposition (SVD) of the satellite-differenced range measurement model matrix for the available observables. Satellite differenced range measurements are the differences between pseudoranges from different satellites so as to cancel the receiver clock error. The range measurement model matrix thus maps the satellite-differenced range measurements onto the 3-dimensioned antenna position error space. It is typically used in a least-squares adjustment (LSA) that computes GNSS antenna position from these satellite-differenced range measurements. It is exactly column rank deficient, i.e. has column rank less than 3, and will have a kernel (also called a null space) if fewer than 4 (i.e. 2 or 3) satellite observables are used to construct fewer than 3 (i.e. 1 or 2) satellite-differenced range measurements. The orthogonal complement of the kernel is the observable subspace for these measurements.

The SVD is a particular method of decomposing a matrix into its SVD components comprising the left singular vectors, the right singular vectors and the singular values. These components provide useful information about the properties of the matrix, such as its image space, kernel or null space, its rank and nearness to lower rank. The SVD is used in the QTC integration process to compute the right singular vectors of the SVD of the satellite-differenced range measurement model matrix. These right singular vectors are orthonormal and divide into basis vectors for unobservable and observable subspaces corresponding to the kernel and kernel orthogonal complement of the satellite-differenced range measurement model matrix. Orthonormal vectors are vectors that have unit length and that are orthogonal to each other.

If 4 or more satellites are available but the geometry formed by these satellites is poor as expressed in a large dilution of precision (DOP), then the satellite-differenced range measurement model matrix is close to being column rank deficient and is said to be approximately column rank deficient. The SVD will in this case yield one or more singular values close to zero. The approximate kernel is spanned by the right singular vectors corresponding to the small singular values. Its orthogonal complement is the strongly observable subspace for these measurements, spanned by the right singular vectors corresponding to its large singular values.

The basis vectors obtained from the SVD for the exact or strongly observable subspace are assembled into a transformation matrix that multiplies the LC IG position measurement and measurement model in an AINS Kalman filter to implement the observable subspace constraint. This is again an easy modification of an LC integration. The consequence is that the AINS Kalman filter position measurement model is constructed only in the observable subspace defined by the available satellite-differenced range measurements, and is thereby consistent with the actual position measurement.

The following variations on when to compute and apply the observable subspace constraint can be used in any embodiment.

In a first variation the AINS Kalman filter applies an observable subspace constraint to the IG position measurement only if fewer than 4 satellites are used to compute the GNSS position solution or DOP is large. In this case the satellite differenced model matrices are exactly or approximately column rank deficient, and the IG position measurement must be constrained to the exact or approximate observable subspace. When 4 or more satellites are available, then the AINS Kalman filter computes the regular, i.e. unconstrained IG position measurement.

In a second variation the AINS Kalman filter applies the observable subspace constraint to the IG position measurement at every epoch. If 4 or more satellites are used in the GNSS position estimator, then the transformation is a non-singular rotation from the navigation frame in which the IG position measurement is normally resolved into a basis spanned by the right singular vectors of the model matrix having a full column rank of 3. The information in the measurement is preserved since the transformation is orthonormal.

The preferred embodiment uses the satellite differenced range measurement model matrix and its SVD to compute the observable subspace constraint based on zero or small singular values. It applies the observable subspace constraint to the IG position measurement every epoch to maintain simplicity and consistency.

1.4 NOTATION

The description that follows provides a number of equations in which, by way of example, the following notation. $\vec{x}$ denotes a vector with no specific reference frame of resolution. The notation $\vec{x}^a$ denotes a vector resolved in a coordinate frame called the a-frame. All coordinate frames are right-handed orthogonal frames. The X-Y-Z axes form an orthogonal triad in the forward, right and down directions. Typical coordinate frames of interest are the geographic frame (g-frame) whose principal axes coincide with the North, East and Down directions, and the inertial sensor body frame (b-frame), whose principal axes coincide with the input axes of the inertial sensors of an inertial guidance system.

Subscripts on vectors are used to indicate a particular property or identification of the vector. For example, $\vec{l}_{sa}^{b}$ is a lever arm vector from an INS sensor frame (s-frame) origin to the GNSS antenna frame (a-frame) resolved in the INS body (b-frame) frame coordinates.

Capital letters, when used as in $C_a^b$, denotes a direction cosine matrix (DCM) that transforms the vector $\vec{x}^a$ from the a-frame to the b-frame, as in the equation, $$\vec{x}^b = C_a^b \vec{x}^a.$$

Time dependency of a quantity is indicated with round brackets around a time variable or index. For example, $C_a^b(t_1)$ denotes the value of the DCM at time $t_1$. An upside down "T" superscript "⊥" is used to indicate the orthogonal complement. "Ker" is used to indicate Kernal.

An increment of a variable is indicated with the symbol $\Delta$. For example, $\Delta \vec{x}$ denotes the increment of the vector $\vec{x}$ over a predefined time interval. An error in a variable is indicated with the symbol $\delta$. For example, $\delta \vec{x}$ denotes the error in the vector $\vec{x}$. $\delta \Delta \vec{x}$ denotes the error in the increment of vector $\vec{x}$ over a predefined time interval.

The small hat above the vector $\hat{x}$ implies that the vector $\vec{x}$ is approximately but not exactly known. It can be an estimate of $\vec{x}$ generated by an estimation process such as a least-squares adjustment (LSA) or Kalman filter. A superscript— on a vector $\vec{x}$ to yield $\vec{x}^-$ indicates an a priori estimate of $\vec{x}$, which is the estimate or best guess of $\vec{x}$ before the occurrence of an estimation process involving new or timely information. A superscript on a vector $\vec{x}$ to yield $\vec{x}^+$ indicates an a posteriori estimate of $\vec{x}$, which is output of an estimation process involving new or timely information.

The following notation is adopted for use in the Drawings and flow charts. The shape of the blocks in the flow charts of FIG. 5-FIG. 7 are defined as follows: Blocks or rectangles with hard or right angle corners identify processes or process steps. Blocks with the shape of a parallelogram signify data being transferred from or to or between processes. Blocks with rounded corners represent exit or entry points. Equal sided parallelograms with signal lines from three or more corners are decision making blocks. A number in the specification or in the claims that appear between a left parenthesis and a right parenthesis, such as (26) at the end of claim 5, is referring to equation 26. A two digit number without brackets in the specification or claims generally relates to a reference number found on the drawings.

2.0 BACKGROUND AND RELATED ART

2.1 Inertial Navigation System

An inertial navigation system (INS) is a navigation instrument that computes its navigation solution by propagating Newton's equations of motion using as inputs measured specific forces or incremental velocities from a triad of accelerometers and measured angular rates or incremental angles from a triad of gyros. A terrestrial INS is designed to navigate on the earth where it is subjected to gravity and earth rate. A celestial INS is designed to navigate in space where in is subjected to smaller gravitational forces from multiple celestial bodies. This disclosure is concerned only with a terrestrial INS. The qualifier "terrestrial" is hereafter implied but not cited explicitly.

An INS can navigate with a specified accuracy after an initialization of the inertial navigator mechanization during which it determines its initial position, initial velocity and North and down directions to a specified accuracy that is commensurate with its inertial sensor errors. The term "alignment" is used to describe this initialization and any ongoing corrections of the inertial navigator mechanization. A free-inertial INS performs an initial alignment and then propagates its navigation solution with no further corrections. See the text by George Siouris, Aerospace Avionics Systems, A Modern Synthesis, Academic Press 1993 for an overview of an INS.

A BRIEF DESCRIPTION OF THE DRAWINGS

2.2 GNSS Receiver

A Global Navigation Satellite System (GNSS) is one of several satellite-based navigation systems. Current GNSS's are the United States deployed Global Positioning System (GPS), the Russian Federation deployed GLONASS, the European Community deployed GALILEO and the Peoples Republic of China deployed COMPASS. A GNSS receiver uses signals received from satellites to compute a position fix and possibly a velocity every receiver epoch. A typical epoch is one second, but can be shorter depending on the receiver design. A GNSS receiver outputs navigation data comprising time, position and possibly velocity every epoch. Some GNSS receivers also output channel data for each tracked satellite comprising pseudoranges, carrier phases and possibly Doppler frequencies for each frequency and modulation protocol broadcast by the satellite. These are often called observables data or simply observables. A publication by J. Spilker & B Parkinson "Global Positioning System, Theory and Practice Volume I, AIAA Press provides descriptions about GPS and GPS receivers.

2.3 Aided INS

An aided INS (AINS) undergoes ongoing corrections to its inertial navigator mechanization or its computed navigation solution. The traditional AINS uses a Kalman filter to estimate INS errors and some means of INS error control to correct the INS errors. A closed-loop AINS uses the estimated INS errors from the Kalman filter to correct the inertial navigator mechanization integrators. This causes the INS alignment to be continuously corrected, and as such is a method for achieving mobile alignment. A feedforward AINS corrects the computed INS navigation solution but leaves the inertial navigator mechanization uncorrected.

Figure 1:
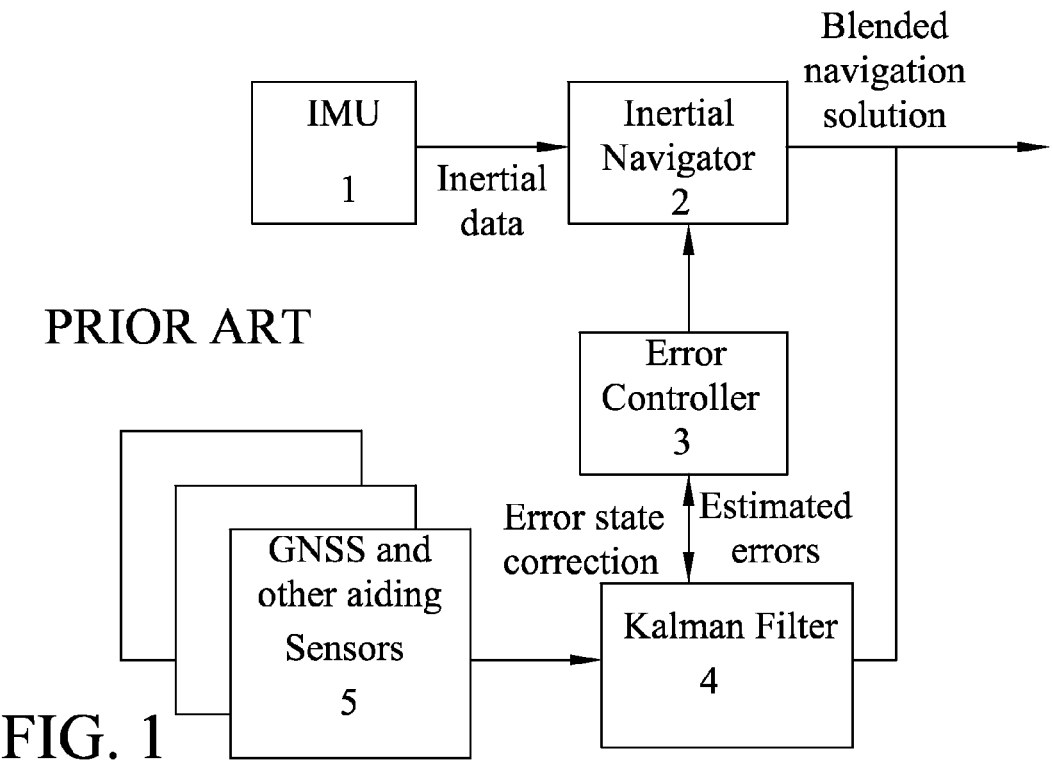
FIG. 1 is a data flow diagram that shows a generic closed-loop AINS architecture.

FIG. 1 shows a generic closed-loop AINS architecture. The inertial measurement unit (IMU) 1 generates incremental velocities and incremental angles at the IMU sampling rate, typically 50 to 500 samples per second. The corresponding IMU sampling time interval is the inverse of the IMU sampling rate, typically $\frac{1}{50}$ to $\frac{1}{1000}$ seconds. The incremental velocities are the specific forces from the IMU accelerometers integrated over the IMU sampling time interval. The incremental angles are the angular rates from the IMU gyros integrated over the IMU sampling time interval. See Reference [2] in the Appendix for information on inertial sensors and IMU mechanizations. The inertial navigator 2 receives the inertial data from the IMU and computes the current IMU position (typically latitude, longitude, altitude), velocity (typically North, East and Down components) and orientation (roll, pitch and heading) at the IMU sampling rate.

The aiding sensors 5 are any sensors that provide navigation information that is statistically independent of the inertial navigation solution that the INS generates. A GNSS receiver is the most widely used aiding sensor, and is the aiding sensor to which this invention applies.

The Kalman filter 4 is a recursive minimum-variance estimation algorithm that computes an estimate of a state vector based on constructed measurements. The measurements typically comprise computed differences between the inertial navigation solution elements and corresponding data elements from the aiding sensors. For example, an inertial-GNSS position measurement comprises the differences in the latitudes, longitudes and altitudes respectively computed by the inertial navigator and a GNSS receiver. The true positions cancel in the differences, so that the differences in the position errors remain. A Kalman filter designed for integration of an INS and aiding sensors will typically estimate the errors in the INS and aiding sensors. The INS errors typically comprise the following:

inertial North, East and Down position errors
inertial North, East and Down velocity errors
inertial platform misalignment errors
accelerometer biases
gyro biases GNSS errors can include the following:
North, East and Down position errors
Carrier phase ambiguities
Atmospheric range errors Reference [3] is a definitive and comprehensive treatment of Kalman filtering. It also contains the aided INS as an example application. Reference [4] provides a detailed analysis of different INS error models that can be used in an AINS Kalman filter.

The error controller 3 computes a vector of resets from the INS error estimates generated by the Kalman filter and applies these to the inertial navigator integration processes, thereby regulating the inertial navigator errors in a closed-loop error control loop. This causes the inertial navigator errors to be continuously regulated and hence maintained at significantly smaller magnitudes that an uncontrolled or free-inertial navigator would be capable of.

Figure 2:
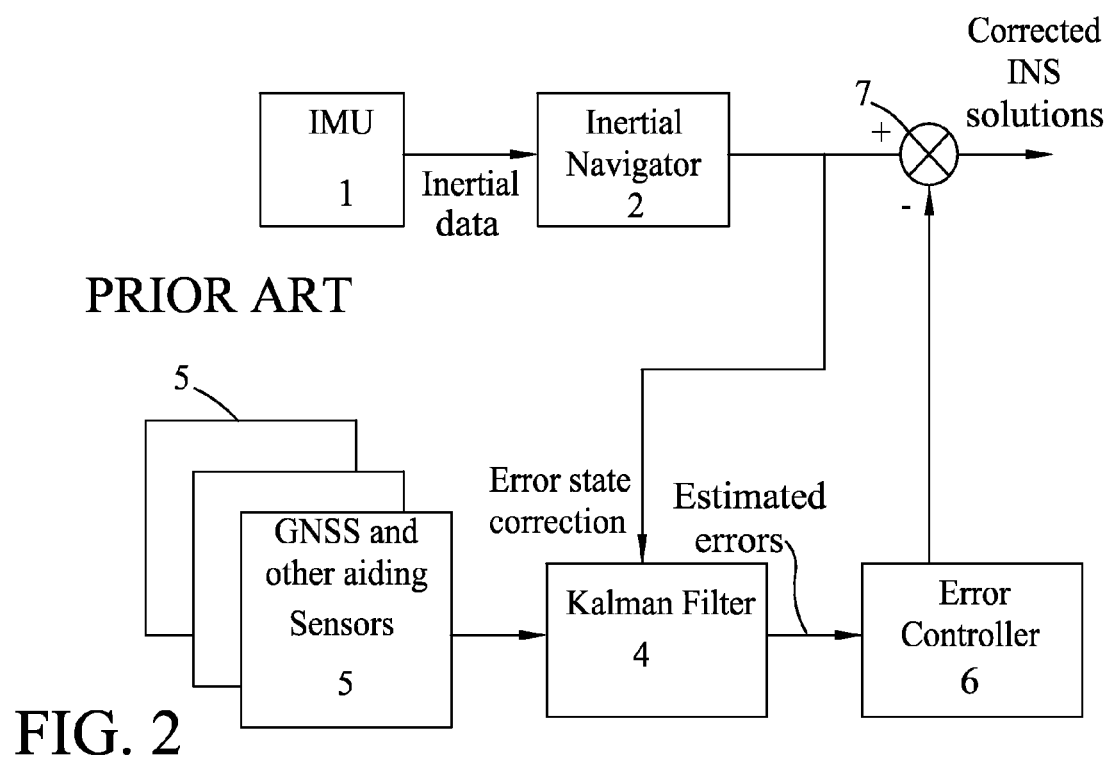
FIG. 2 is a data flow diagram that shows a generic feedforward aided INS solution.

FIG. 2 shows a generic feedforward AINS. The IMU 1, inertial navigator 2, Kalman filter 4 and GNSS receiver and other aiding sensors 5 are the same as those shown in the closed-loop AINS in FIG. 1. The inertial navigator 2 is assumed to be aligned and operating free-inertially with a position error rate that is typical of an INS and commensurate with its inertial sensors. The error controller 6 computes corrections to the free-inertial INS solution. The summing junction 7 performs the corrections.

The state-of-the-art in aided inertial navigation is mature. The technology originated in the late 1960's, and found application on several military navigation systems. Since then, much research has been conducted and much literature has been generated on the subject.

2.4 Types of GNSS-Aided INS Integrations

2.4.1 Tightly-Coupled Integration

A tightly-coupled (TC) GNSS-AINS integration uses the observables from the GNSS receiver to construct Kalman filter range measurements, typically one for each receiver channel that tracks a satellite. The commonly known advantage of a TC integration is its optimal use of any and all information in the observables regardless of the number of satellites, including fewer than 4 satellites. An additional advantage reported in [11] is rapid fixed integer ambiguity recovery following a GNSS outage. This is a consequence of the inertial coast of position accuracy through the outage that accelerates the convergence of estimated ambiguities and subsequent ambiguity resolution.

2.4.2 Loosely-Coupled Integration

Figure 3:
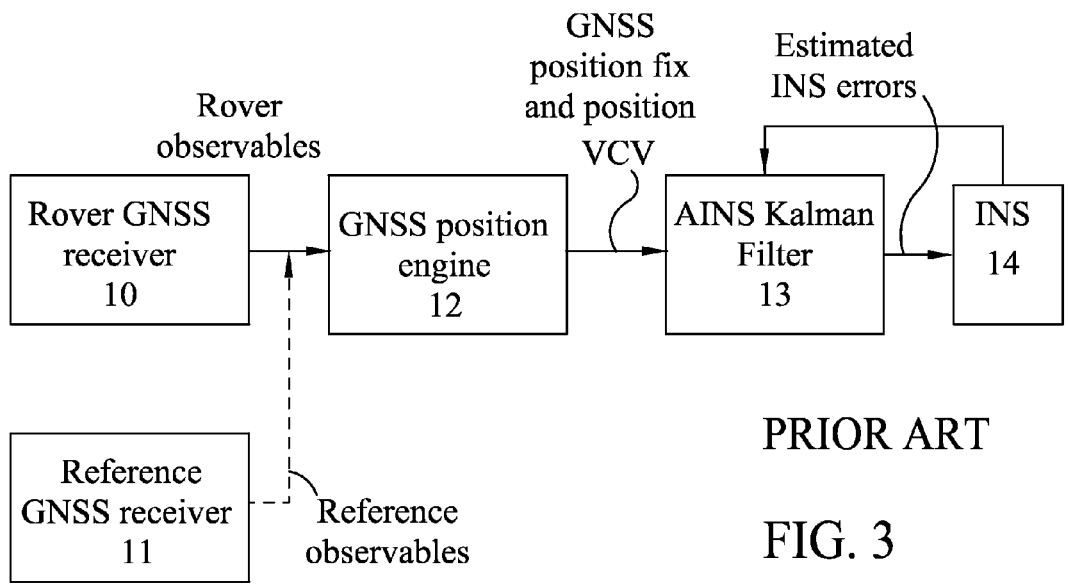
FIG. 3 is a data flow diagram that shows an LC (loosely coupled) integration architecture.

A loosely-coupled (LC) GNSS-AINS integration uses the position fixes and possibly the velocity fixes computed by the GNSS receiver. FIG. 3 shows an LC integration architecture. The AINS Kalman filter 13 (same as or similar to the AINS Kalman filter 4 in FIG. 1) constructs an INS-GNSS (IG) position measurement that differences the respective position fixes from the INS and the GNSS receiver.

$$\vec{z}_{IG} = \vec{r}_{INS} - \vec{r}_{GNSS} \quad (1)$$

where $\vec{r}_{INS}$ is the predicted GNSS antenna position computed from the INS navigation solution $\vec{r}_{GNSS}$ is the GNSS antenna position measured by the GNSS receiver.

The IG position measurement can be constructed in any Cartesian coordinate frame of convenience. The following is an example of the IG position measurement constructed in the ECEF coordinate frame.

$$\vec{z}_{IG} = \vec{z}_{INS}^e - \vec{z}_{GNSS}^e \quad (2)$$

where $$\vec{z}_{INS}^e = \vec{z}_s^e + C_g^e C_b^e \vec{l}_{sa}^b \quad (3)$$

where $\vec{r}_s^e$ is the INS position resolved in the ECEF coordinate frame, $\vec{r}_{GNSS}^e$ is the GNSS antenna position computed by the GNSS receiver (same as $\vec{r}_{GNSS}$ in (1)), $\vec{l}_{sa}^e$ is the lever arm vector from the INS to the GNSS antenna resolved in the INS body frame, $C_b^g$ is a direction cosine matrix (DCM) from the INS body frame to the local geographic frame (North-East-Down coordinates) computed from the INS-generated roll, pitch and heading, $C_g^e$ is a DCM from the geographic frame to the ECEF frame computed from the INS-generated latitude and longitude.

The following is an example of the IG position measurement constructed in the local geographic or North-East-Down coordinate frame.

$$\vec{z}_{IG} = \begin{bmatrix} (\lambda_s - \lambda_a)/r_e \\ (L_s - L_a)/r_e \cos\lambda_s \\ -h_s + h_a \end{bmatrix} + C_b^g \vec{l}_{sa}^b \quad (4)$$

where $(\lambda_s, L_s, h_s)$ and $(\lambda_a, L_a, h_a)$ are respectively the INS and GNSS antenna geographic coordinates (latitude, longitude, altitude) and $r_e$ is the mean earth radius.

The AINS Kalman filter 4 implements a measurement model that has the generic form $$\vec{z}_{IG} = A_{IG} \vec{x}_{AINS} + \vec{\eta}_{IG} \quad (5)$$

where $\vec{x}_{AINS}$ is the AINS Kalman filter state vector, $A_{IG}$ is the IG position measurement model matrix and $\vec{\eta}_{IG}$ is the measurement noise model with covariance $R_{IG}$. The measurement model is expanded as follows.

The components of the measurement (1) comprise the true antenna position $\vec{r}_a$ plus INS and GNSS errors as follows.

$$\vec{r}_{INS} = \vec{r}_a + \delta \vec{r}_{INS} \quad (6)$$

$$\vec{r}_{GNSS} = \vec{r}_a + \delta \vec{r}_{GNSS} \quad (7)$$

where $\delta \vec{r}_{INS}$ is the error in $\vec{r}_{INS}$, $\delta \vec{r}_{GNSS}$ is the error in $\vec{r}_{GNSS}$.

The true antenna position cancels in measurement (1) leaving a difference of the INS and GNSS errors.

$$\vec{z}_{IG} = \delta \vec{r}_{INS} - \delta \vec{r}_{GNSS} \quad (8)$$

The measurement model (5) is expressed in terms of the components of the state vector $\vec{x}_{AINS}$ that are the INS and GNSS position errors.

$$\vec{z}_{IG} = \underbrace{[\, C_w^g \quad 0 \quad -I \quad 0 \,]}_{A_{IG}} \underbrace{\begin{bmatrix} \delta \vec{r}_I^w \\ 0 \\ \delta \vec{r}_G^g \\ 0 \end{bmatrix}}_{\vec{x}_{AINS}} + \vec{\eta}_{IG} \quad (9)$$

where $\delta \vec{r}_I^w$ is a sub-vector of $\vec{x}_{AINS}$ comprising the INS position errors resolved in the INS wander angle navigation frame, $\delta \vec{r}_G^g$ is a sub-vector of $\vec{x}_{AINS}$ comprising the GNSS position errors resolved in the local geographic frame, $\vec{\eta}_{IG}$ is the measurement noise model with covariance $R_{IG} = E[\vec{\eta}_{IG} \vec{\eta}_{IG}^T]$.

The measurement model (9) assumes the INS and GNSS position errors are statistically uncorrelated. Consequently a Kalman filter update will yield an INS position VCV that is constrained by the IG measurement in all three axes of the Cartesian navigation frame in which $\vec{z}_{IG}$ is constructed.

2.5 GNSS Positioning Algorithm

The rover GNSS receiver 10 generates a set of observables per receiver channel that tracks a satellite signal every epoch. The epoch duration is typically 1 second but can be shorter depending on the receiver design and on its configuration set by the user. The observables for a GPS satellite comprise some or all of the following depending on the design of the receiver:

L1, L2, L2C, L2M, L5 pseudoranges
L1, L2, L2C, L2M, L5 carrier phases

Comparable observables may be obtained for GLONASS, GALILEO and COMPASS satellites, again depending on the receiver design. The optional reference GNSS receiver 11 is located at a known stationary position. It generates some or all of the observables generated by the rover receiver that are typically required to compute one of several types of differential GNSS position fixes. The GNSS position engine 12 in a typical receiver implements a GNSS positioning algorithm.

It receives the rover observables and possibly the reference observables, and with these computes an antenna position fix and possibly an estimation variance-covariance (VCV) matrix. The GNSS positioning algorithm can range from a simple trilateration of pseudoranges to a sophisticated precision position algorithm that computes a kinematic ambiguity resolution (KAR) solution having centimeter-level accuracy relative to the reference receiver position.

2.6 GNSS Positioning Using Least Squares Adjustment

The following is a summary of the single point position (SPP) solution in any Cartesian coordinate frame such as the earth-centered-earth-fixed (ECEF) frame. This is likely the simplest GNSS positioning algorithm, and can be cast as representative of any other positioning algorithm that computes an antenna position fix from GNSS range measurements.

Given an a priori (before estimation) rover antenna position $\vec{r}_g^-$, the a posteriori SPP solution is the corrected a priori position $$\vec{r}_g^+ = \vec{r}_g^- - \delta\hat{\vec{r}}_g \tag{10}$$

where $\delta\hat{\vec{r}}_g$ is the estimated error in the a priori position solution obtained from a least squares adjustment (LSA) of range measurements. The following two least squares adjustments using undifferenced and satellite differenced range measurement models can be used to compute $\delta\hat{\vec{r}}_g$.

2.6.1 Undifferenced Range Measurement Model

The linearized measurement model relating a GNSS range measurement to the antenna position and receiver clock error is the following.

$$\hat{r}_i - \rho_i = -\vec{u}_i^T \delta \vec{r}_g - \delta T \tag{11}$$

where $\hat{r}_i = |\vec{r}_i - \hat{\vec{r}}_g|$ is the predicted range between satellite position $\vec{r}_i$ and the computed antenna position $\hat{\vec{r}}_g$, $\rho_i$ is the i-th GNSS range measurement such as the i-th pseudorange or range-equivalent carrier phase, $\delta \vec{r}_g$ is the antenna position error, $\delta T$ is the receiver clock error.

m satellite observables are used to construct m measurements of the form (11) with i=1, . . . , m to form the vector measurement equation of the form $$\vec{z} = H\vec{x} \tag{12}$$

where (12) has the following components.

The undifferenced range measurement vector is the following.

$$\vec{z} = \begin{bmatrix} \hat{r}_1 - \rho_1 \\ \vdots \\ \hat{r}_m - \rho_m \end{bmatrix} \tag{13}$$

The undifferenced range measurement model matrix is the following.

$$H = \begin{bmatrix} -\vec{u}_1^T & -1 \\ \vdots & \vdots \\ -\vec{u}_m^T & -1 \end{bmatrix} \tag{14}$$

The LSA state vector is $$\vec{x} = \begin{bmatrix} \delta\vec{r}_g \\ \delta T \end{bmatrix} \tag{15}$$

where the unit line-of-sight (LOS) vector from the rover position $\vec{r}_g$ to the i-th satellite position $\vec{r}_i$ is the following.

$$\vec{u}_i = \frac{\vec{r}_i - \vec{r}_g}{|\vec{r}_i - \vec{r}_g|} \tag{16}$$

The LSA that minimizes the objective $$s_{opt} = \min_{\vec{x}} \left( (\vec{z} - H\hat{\vec{x}})^T W (\vec{z} - H\hat{\vec{x}}) \right) \tag{17}$$

is $$\hat{\vec{x}} = (H^T W H)^{-1} H^T W \vec{z} \tag{18}$$

where W is a positive definite symmetric weight matrix. The LSA solution is unique if H has full column rank, which occurs with near certainty if m≥4. Column rank deficiency with m≥4 is a consequence of two LOS vectors coinciding, which is a rare occurrence.

In a system of m equations and n unknowns described by (12), the null space or kernel of the m×n matrix H comprises all n-dimensioned vectors $\vec{x}$ such that $H\vec{x}$=0. The kernel of H is written as Ker (H) and is non-trivial if H is rank deficient, which happens if m is less than n, as in the case where there are fewer equations to be solved than the number of variables in each equation.

Only column rank deficient matrices have kernels. Column rank deficiency implies the matrix does not have linearly independent columns. If the columns of a matrix H are $\vec{h}_1, \ldots, \vec{h}_n$ then linear dependence implies at least one column can be cast as a linear combination of the other columns, i.e. $\vec{h}_i = s_1\vec{h}_1 + \ldots + s_{i-1}\vec{h}_{i-1} + s_{i+1}\vec{h}_{i+1} + \ldots + s_n\vec{h}_n$. An m×n matrix is column rank deficient if m is less than n or if n is greater than m and its columns are not linearly independent.

2.6.2 Satellite-Differenced Measurement Model

The receiver clock error is removed by computing differences between GNSS range measurements in (11) as follows using $\Delta x_{ij}$ $$\triangleq$$

$x_i - x_j$ and
$\Delta \vec{u}_{ij}^T = \vec{u}_i^T - \vec{u}_j^T$;

$$\Delta \hat{r}_{ij} - \Delta \rho_{ij} = -\Delta \vec{u}_{ij}^T \delta \vec{r}_g \tag{19}$$

m satellites observables are used to construct m−1 satellite differenced measurements where without loss of generality i=1, . . . , m−1 and j=m is suppressed for clarity. The satellite differences are generated by pre-multiplying both sides of (12) by an m×m differencing matrix D given by $$D = I - B \quad (20)$$

$$B = \begin{bmatrix} 0_{m-1 \times m-1} \vec{b} \\ \hline 0_{1 \times m} \end{bmatrix}$$

$$\vec{b} = \begin{bmatrix} 1 \\ \vdots \\ 1 \end{bmatrix}_{1 \times m-1}$$

The satellite differenced measurement model is given by $$\vec{z}_D = H_D \vec{x} \quad (21)$$

where $$\vec{z}_D = D_{\vec{z}} = \begin{bmatrix} \vec{z}_d \\ z_m \end{bmatrix} \quad (22)$$

$$H_D = DH = \begin{bmatrix} H_d & 0 \\ -\vec{u}_m^T & -1 \end{bmatrix} \quad (23)$$

where (21) has the following components.

The satellite differenced range measurement vector is given as follows.

$$\vec{z}_d = \begin{bmatrix} \Delta \hat{r}_1 - \Delta \rho_1 \\ \vdots \\ \Delta \hat{r}_{m-1} - \Delta \rho_{m-1} \end{bmatrix} \quad (24)$$

where the m-th undifferenced range measurement vector is given as follows.

$$z_m = \hat{r}_m - \rho_m \quad (25)$$

The satellite differenced range measurement model matrix is given as follows.

$$H_d = \begin{bmatrix} -\Delta \vec{u}_1^T \\ \vdots \\ -\Delta \vec{u}_{m-1}^T \end{bmatrix} \quad (26)$$

The LSA that minimizes the objective $$\min_{\vec{x}} (\vec{z}_D - H_D \vec{x})^T W (\vec{z}_D - H_D \vec{x}) = \min_{\vec{x}} ((\vec{z} - H\vec{x})^T D^T W D(\vec{z} - H\vec{x})) \quad (27)$$

is $$\delta \hat{\vec{r}}_g = (H_d^T W_d H_d)^{-1} H_d^T W_d \hat{\vec{z}}_d \quad (28)$$

$$\delta \hat{T} = -z_m - \vec{u}_m^T \delta \hat{\vec{r}}_g \quad (29)$$

where Wd is the upper (m−1)×(m−1) sub-matrix of W. The LSA solution is unique if $H_d$ has column rank, which occurs with near certainty if m>4.

The satellite differencing operation thus separates the least-squares estimations of position error and clock error. (28) is the LSA solution of the satellite differenced measurement model $$\vec{z}_d = H_d \delta \vec{r}_g \quad (30)$$

and (29) is the LSA estimate of the receiver clock error given an estimated position error (28). This is not in general the same solution as (18) in which both are estimated together. The LSA solution (28) using the satellite differenced measurement model (30) does however provide a means of estimating only the position error if the receiver clock error is not required.

2.6.3 Generalized Satellite Differencing

The satellite-differenced range measurement model matrix (26) can be generalized as follows. The undifferenced range measurement model matrix (14) is cast as follows, $$H = [L^T \vec{k}] \quad (31)$$

where $$L^T = \begin{bmatrix} -\vec{u}_1^T \\ \vdots \\ -\vec{u}_m^T \end{bmatrix} \quad (32)$$

$$\vec{k} = \begin{bmatrix} -1 \\ \vdots \\ -1 \end{bmatrix}$$

An m×m nonsingular transformation E that effects receiver clock error cancellation is given as follows $$EH = \begin{bmatrix} E_1 \\ E_2 \end{bmatrix} [L^T \vec{k}] = \begin{bmatrix} E_1 L^T & E_1 \vec{k} \\ E_2 L^T & E_2 \vec{k} \end{bmatrix} = \begin{bmatrix} H_1 & 0 \\ H_{21} & H_2 \end{bmatrix} \quad (33)$$

so that $$EH\vec{x} = \begin{bmatrix} H_1 \delta \vec{r} \\ H_{21} H_1 \delta \vec{r} + H_2 \delta T \end{bmatrix} \quad (34)$$

(33) implies that $E_1 \vec{k} = \vec{0}$ which in turn implies that the sum of each row of E1 is zero. This describes one or more satellite differences per row. $E_1 L^T = H_1$ must have column rank one less than the column rank of H for any H, consequently E1 must have full row rank. This implies that each row of E1 must describe a unique satellite difference. E2 is any 1×m matrix so that E is nonsingular.

There exists a nonsingular m×m matrix T such that E=TD. This implies that the differencing transformation D in (20) is representative of all possible transformations E that can be used in the invention. The differencing transformation D in (20) is used hereafter without loss of generality.

2.6.4 Column Rank Deficient Measurement Model

The range measurement model H is column rank deficient when it has fewer than 4 rows. It has a kernel or null space labeled as Ker (H) and defined as follows: $\vec{x} \in$ Ker (H) if and only if $H\vec{x} = 0$. Similarly the measurement model $H_d$ is column rank deficient range when it has fewer than 3 rows. Both column rank deficiencies occur when fewer than 4 satellites are available for computing a position solution. The LSA as given in (18) cannot be computed because $H^T W H$ is singular. Likewise the LSA as given in (28) cannot be computed because $H_d^T W_d H_d$ is singular.

The range measurement model H can be column rank deficient when it has 4 or more rows and one or more rows are linear combinations of the remaining rows so that there are in fact fewer than 4 linearly independent rows. This occurs in a range measurement model matrix only if two or more satellites are exactly coincident. For example the following H constructed with 4 satellites is a 4×4 matrix $$H = \begin{bmatrix} \vec{h}_1^T \\ \vec{h}_2^T \\ \vec{h}_3^T \\ \vec{h}_4^T \end{bmatrix} \quad (35)$$

where $\vec{h}_i^T$ is the i-th row of H represented as a transposed vector. If for example $\vec{h}_4^T = \vec{h}_1^T$ because the satellites corresponding to rows 1 and 4 are exactly coincident, then H is row and column rank deficient because it has only 3 independent rows and hence only 3 independent columns. A similar example can be constructed for a satellite differenced measurement model matrix $H_d$. This cannot occur within a single GNSS such as GPS because the satellite orbital radii are the same. This might happen if H describes range measurements from two different GNSS's such as GPS and GLONASS since their respective satellites have different orbit radii. This is a pathological occurrence, i.e. has miniscule probability of happening. Satellites can however be close to each other and hence close to being coincident. In this case H or $H_d$ can become close to being column rank deficient.

The following analysis of the undifferenced range measurement model H is equally applicable to the satellite differenced range measurement model $H_d$.

The singular value decomposition (SVD) of an m×n matrix H is the following, $$H = U \sum V^T = [U_1 U_2] \begin{bmatrix} \sum_1 & 0 \\ 0 & 0 \end{bmatrix} \begin{bmatrix} V_1^T \\ V_2^T \end{bmatrix} \quad (36)$$

where

V is an n×n orthonormal matrix that spans the n-dimensioned state space $\Re^n$, U is an m×m orthonormal matrix that spans the m-dimensioned measurement space $\Re^m$, $\Sigma_1$ is an m×n trapezoidal matrix with $\Sigma_1$ a diagonal matrix of non-zero singular values.

The SVD is a method of decomposing a matrix H into its SVD components U, V and $\Sigma$ that have useful properties for characterizing a matrix and understanding its properties. The following SVD properties are relevant to this disclosure:

The columns of $V_1$ form an orthonormal basis for $Ker(H)^\perp$ the orthogonal complement of the null space or kernel of H.

The columns of $V_2$ form an orthonormal basis for Ker (H) the kernel of H.

The following properties result from the SVD (36) when H is column rank deficient.

Subspace Components

The columns of $V=[V_1 V_2]$ form an orthonormal basis for $\Re^n$. Then for any $\vec{x} \in \Re^n$ there exists $\vec{b}1 \in \Re^n$ such that $$\vec{x} = V\vec{b} \quad (37)$$
$$= [V_1 V_2] \begin{bmatrix} \vec{b}_1 \\ \vec{b}_2 \end{bmatrix}$$
$$= \vec{x}_1 + \vec{x}_2$$

where $\vec{x}_1 = V_1 \vec{b}1_1$ and $\vec{x}_2 = V_2 \vec{b}1_2$.

Furthermore $V^T \vec{x} = \vec{b}1$ implies $$V^T \vec{x}_1 = \begin{bmatrix} \vec{b}_1 \\ 0 \end{bmatrix} \quad (38)$$

and $$V^T \vec{x}_2 = \begin{bmatrix} 0 \\ \vec{b}_2 \end{bmatrix}$$

Thus V is a rotation matrix that transforms $\vec{x}$ into a canonical form comprising partitioned sub-vectors in Ker (H) and $Ker(H)^\perp$. The sub-vectors are generated as follows.

$$V_1^T \vec{x} = V_1^T V_1 \vec{b}1_1 + V_1^T V_2 \vec{b}1_2 = \vec{b}1_1 \quad (39)$$

$$V_2^T \vec{x} = V_2^T V_1 \vec{b}1_1 + V_2^T V_2 \vec{b}1_2 = \vec{b}1_2 \quad (40)$$

$$V_1 V_1^T \vec{x} = V_1 \vec{b}1_1 = \vec{x}_1 \quad (41)$$

$$V_2 V_2^T \vec{x} = V_2 \vec{b}1_2 = \vec{x}_2 \quad (42)$$

LSA Solution

The measurement equation (12) becomes the following.

$$\vec{Z} = U_1 \Sigma_1 V_1^T \vec{x} \quad (43)$$

The complete set of solutions that minimize the least squares objective function (17) are characterized as follows, $$\hat{\vec{x}} = \hat{\vec{x}}_1 + \vec{x}_2 \quad (44)$$

where $$\hat{\vec{x}} = V_1 \Sigma_1^{-1} U_1^T \vec{Z} \quad (45)$$

and $\vec{x}_2 = V_2^T \vec{b}1$ is any linear combination of the columns of $V_2$. The LSA solution (44) is therefore not unique, comprising the sum of $\hat{\vec{x}} \in Ker(H)^\perp$ and any vector $\vec{x}_2 \in Ker(H)$. The solution with the minimum vector norm is $\hat{\vec{x}} = \hat{\vec{x}}_1$.

Kernel Equivalence $$\begin{bmatrix} \delta \vec{r} \\ \delta T \end{bmatrix} \in Ker(H)$$

is equivalent to $\delta \vec{r} \in Ker(H_d)$ and $$\vec{u}_m^T \delta \vec{r} = -\delta T \quad (46)$$

This is shown as follows.

$H\bar{x} = 0$ for any $\bar{x} \in \text{Ker}(H)$ implies $$DH\bar{x} = \begin{bmatrix} H_d \delta \bar{r} \\ -\bar{u}_m^T \delta \bar{r} - \delta T \end{bmatrix} = 0$$

and hence $\delta \bar{x} \in \text{Ker}(H_d)$ and $\bar{u}_m^T \delta \bar{r} = -\delta T$. Since D is nonsingular, the reverse implication $DH\bar{x} = 0 \Rightarrow H\bar{x} = 0$ also holds.

2.7 Dilution of Precision (DOP

2.7.1 DOP for Undifferenced Range Measurements

The position dilution of precision (PDOP) and time dilution of precision (TDOP) for the undifferenced range measurement model (13) are defined as follows.

$$G = (H^T H)^{-1} \tag{47}$$

$$PDOP = \sqrt{\sum_{i=1}^{3} G(i, i)} \tag{48}$$

$$TDOP = \sqrt{G(4, 4)}$$

The dilution of precision (DOP) is the root-sum-square of PDOP and TDOP.

$$DOP = \sqrt{DPOP^2 + TDOP^2} = \sqrt{\sum_{i=1}^{4} G(i, i)} \tag{49}$$

The SVD representation $H = U\Sigma V^T$ applied to (47) yields $$G = (V\Sigma U^T U\Sigma V^T)^{-1} = (V\Sigma^2 V^T)^{-1} = V\Sigma^{-2} V^T \tag{50}$$

since $V^T = V^{-1}$. Then (50) becomes the following $$G = \begin{bmatrix} \sum_{i=1}^{4} \frac{\{\bar{v}_i\}_1^2}{s_i^2} & \cdots & \sum_{i=1}^{4} \frac{\{\bar{v}_i\}_1 \{\bar{v}_i\}_4}{s_i^2} \\ \vdots & \ddots & \vdots \\ \sum_{i=1}^{4} \frac{\{\bar{v}_i\}_1 \{\bar{v}_i\}_4}{s_i^2} & \cdots & \sum_{i=1}^{4} \frac{\{\bar{v}_i\}_4^2}{s_i^2} \end{bmatrix} \tag{51}$$

where $\{\bar{v}_i\}_j$ is the j-th element of the i-th right singular vector. (49) then becomes the following.

$$DOP = \sqrt{\sum_{j=1}^{4} \sum_{i=1}^{4} \frac{\{\bar{v}_i\}_j^2}{s_i^2}} = \sqrt{\sum_{i=1}^{4} \frac{1}{s_i^2} |\bar{v}_i|^2} = \sqrt{\sum_{i=1}^{4} \frac{1}{s_i^2}} \tag{52}$$

(52) relates DOP to the singular values of H. It also shows how an ill-conditioned H having at least one singular value that is near zero generates a large DOP.

2.7.2 DOP for Satellite Differenced Range Measurements

PDOP for a satellite differenced range measurement model is defined as follows.

$$G_d = (H_d^T H_d)^{-1} \tag{53}$$

$$PDOP_d = \sqrt{\sum_{i=1}^{3} G_d(i, i)} \tag{54}$$

[15] provides the following bounds on $PDOP_d$ for m>4.

$$\frac{1}{\sqrt{m}} PDOP \leq PDOP_d \leq PDOP \tag{55}$$

A development similar to (50) to (52) results in $$PDOP_d = \sqrt{\sum_{i=1}^{3} \frac{1}{c_i^2}} \tag{56}$$

where $c_i$ for i=1, 2, 3 are the singular values of $H_d$. (56) relates PDOP for satellite differenced range measurements to singular values of $H_d$, and in particular points to a method for identifying nearness to rank deficiency from PDOP.

2.7.3 Nearness to Column Rank Deficiency

If all of the singular values of $H_d$ are non-zero, then $H_d$ technically has rank 3 which is full column rank. It may however be close to being column rank deficient because one or more of its singular values are small. This can happen if two or more satellites are close to each other and hence close to being coincident. Equation (56) for $PDOP_d$ comprises the RSS of the inverse singular values. Hence, if any one singular value becomes small, it will cause its inverse squared to become large. Equation (55) says that PDOP is equal to or larger than $PDOP_d$, and so if $PDOP_d$ becomes large, then PDOP will also become large. Therefore, if equation (56) shows that $PDOP_d$ will be large, equation (55) shows that PDOP will also be large.

The specification of a small singular value of $H_d$ is $$c_i < c_{min} \tag{57}$$

where $c_{min}$ is a specified minimum value of a large singular value. If the ns smallest singular values $c_i$ for i=4−ns, ..., 3 and ns=1 or 2 are small according to (57), then $$PDOP_d = \sqrt{\sum_{i=1}^{3-n_s} \frac{1}{c_i^2} + \sum_{i=4-n_s}^{3} \frac{1}{c_i^2}} > \sqrt{\sum_{i=4-n_s}^{3} \frac{1}{c_i^2}} > \frac{\sqrt{n_s}}{c_{min}} \tag{58}$$

(58) shows that $\sqrt{n_s}/c_{min}$ is a lower bound on $PDOP_d$ which in turn is a lower bound on PDOP from (55).

A specified maximum PDOP $d_{max}$ is used to determine when $H_d$ is considered nearly column rank deficient. Setting $c_{min} = \sqrt{n_s}/d_{max}$ in (58) causes $PDOP_d > d_{max}$ if ns singular values are smaller than $c_{min}$. To avoid dependency on ns, set $c_{min} = 1/d_{max}$ so that (58) becomes $$PDOP_d > d_{max}\sqrt{n_s} \geq d_{max} \tag{59}$$

Thus a specification $d_{max}$ translates to a specification on a small singular value threshold $c_{min} = 1/d_{max}$ for the purpose of identifying small singular values and $H_d$ being nearly column rank deficient.

3.0 INVENTION DESCRIPTION

3.1 Scope

Section 3.2 provides a theoretical development of the key process steps that are described at the beginning of the section, i.e. INS position seeding and OSC. Section 3.2.2 describes INS position seeding of the GNSS position algorithm. It describes how the unobservable component of the estimated position error is a consequence of INS position seeding when not enough satellites are available and how this presents a problem to the GNSS-AINS without the OSC. Section 3.2.3 describes the OSC as the solution to this problem and how it is constructed using the SVD of Hd. Section 3.3 presents the preferred embodiment of the QTC algorithm as a step-by-step process with flowcharts. It references the key equations that were developed in Sections 2.0 and 3.2 simply to not be repetitive.

3.2 QTC Integration Algorithm

3.2.1 Architecture and Data Flow

QTC integration is achieved via two key mechanisms added to a standard LC integration:
 INS position seeding of the GNSS position fix algorithm.
 Observable subspace constraint (OSC) on INS-GNSS position measurement in the AINS Kalman filter.

Figure 4:
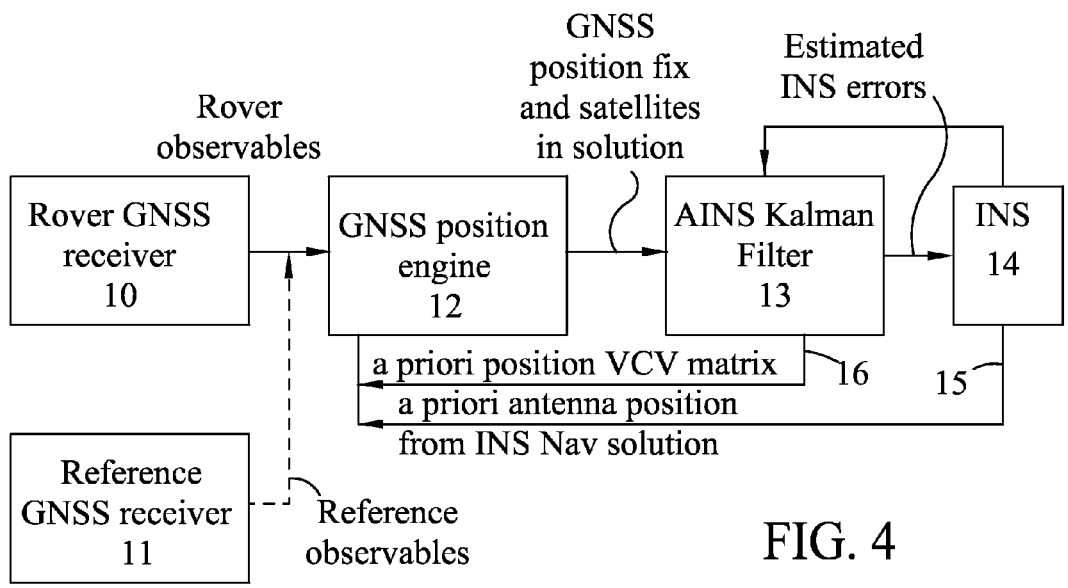
FIG. 4 is a data flow diagram that shows the QTC GNSS AINS architecture and data flow. It comprises a combination of the generic LC integration of FIG. 3 with the added steps of the processes shown in FIGS. 5, 6 and 7.

FIG. 4 shows the QTC GNSS AINS architecture and data flow. It comprises the generic LC integration in FIG. 3 with the following additions:
 The a priori antenna position 15 derived from the INS navigation solution and position VCV matrix 16 derived from the AINS Kalman filter estimation VCV is fed back to the GNSS position engine 12 that uses this data to implement INS position seeding.
 A modified IG position measurement in the AINS Kalman filter 13 implements the OSC.

3.2.2 INS Position Seeding

The following describes the a priori antenna position 15 computed from INS data resolved in an earth-centered-earth-fixed (ECEF) Cartesian coordinate frame.

$$\vec{b}_a^e = \vec{r}_s^e + C_w^e C_b^w \vec{l}_{sa}^b \quad (60)$$

where
 $\vec{r}_s^e$ is the a priori INS position vector in the ECEF coordinate frame,
 $\vec{l}_{sa}^b$ is the lever arm vector from the INS to the GNSS antenna resolved in the INS body coordinate frame,
 $C_b^w$ is the direction cosine matrix (DCM) from the INS body frame to the INS navigation frame (typically the wander angle frame) computed using the INS roll, pitch and platform heading,
 $C_w^e$ is the DCM from the INS navigation frame to the ECEF frame using the INS latitude, longitude and wander angle.

The corresponding position VCV matrix 16 is computed as follows.

$$P_{\delta r}^e = C_w^e P_{\delta r}^w C_w^{eT} \quad (61)$$

where
 $P_{\delta r}^w$ is the 3×3 sub-matrix of the AINS Kalman filter estimation VCV matrix corresponding to the INS position error states.

The GNSS position engine 12 receives the following necessary input data every GNSS epoch for computing a position solution as part of the QTC integration:
 Rover GNSS observables comprising one set of pseudoranges and carrier phases corresponding to one or more carrier frequencies for each tracked satellite
 A priori antenna position 15 from the INS and corresponding position error VCV matrix 16 from the AINS Kalman filter.

The GNSS position engine 12 may receive the following optional input data every GNSS epoch for computing a differential GNSS position solution:
 GNSS observables comprising one set of pseudoranges and carrier phases corresponding to one or more carrier frequencies for each tracked satellite from one or more reference receivers 11.

The GNSS position engine 12 computes an antenna position and position VCV matrix from these data. As part of this position fix computation, it does one of the following:
 a. It uses the antenna position 15 computed from INS data as its a priori position and the INS position error VCV 16 computed from the AINS Kalman filter as its a priori position VCV. An example is the LSA SPP algorithm (17) and (18) that uses the INS-derived antenna position as an a priori position.
 b. It uses the antenna position 15 computed from INS data as a position measurement in its estimation process. It uses the INS position error VCV 16 computed from the AINS Kalman filter to compute the position measurement covariance. An example of such a GNSS position engine is a GNSS Kalman filter that estimates the antenna position using measurements constructed from GNSS observables and the INS-derived antenna position.

The actual GNSS positioning algorithm that the GNSS position engine 12 implements is not important. The actual algorithm is approximated by a simple GNSS positioning algorithm comprising the following sequence of operations:
 1. The a priori antenna position is set to the antenna position 15 computed from INS data.
 2. The a priori position VCV is set to the INS position error VCV 16.
 3. An SPP algorithm uses a range measurement model (12) to (16) and a set of pseudoranges to the m satellites used by the GNSS positioning algorithm. It computes the antenna position error as in (18) and from this a corrected antenna position as in (10). The pseudoranges $\rho_i$, i=1, ..., m are consistent with the range error model (11) and have accuracies consistent with the actual position error generated by the GNSS position engine 12.

The range measurement model matrix (14) contains the satellite geometry that every GNSS positioning algorithm has to work with. PDOP described by (48) parameterizes the geometry-dependent position error that every GNSS positioning algorithm typically generates.

If the range measurement model matrix (14) is column rank deficient because fewer than 4 satellites are available, then Ker (H) defines an unobservable subspace in the 4-dimensioned position-time error space defined by the state vector (15). In this case the GNSS positioning algorithm uses the minimum norm SPP solution (45) to estimate position and receiver clock error in the observable subspace defined by the kernel orthogonal complement Ker (H)$^\perp$, and with this compute a corrected antenna position as in (10).

The a priori position 15 used by the SPP algorithm at a given epoch comprises the true position plus the INS position error.

$$\vec{r}^- = \vec{r} + \delta \vec{r}_{INS} \quad (62)$$

The true a priori state vector (15) is partitioned as in (44) as follows $$\vec{x}^- = \begin{bmatrix} \delta \vec{r}_{INS} \\ \delta T^- \end{bmatrix} = \vec{x}_1^- + \vec{x}_2^- \quad (63)$$

where $\vec{x}_1^- = \begin{bmatrix} \delta \vec{r}_{INS1} \\ \delta T_1^- \end{bmatrix} \in Ker(H)^\perp$ and $\vec{x}_2^- = \begin{bmatrix} \delta \vec{r}_{INS2} \\ \delta T_2^- \end{bmatrix} \in Ker(H)$.

The true measurement vector (12) is given as follows:

$$\vec{z} = H(\vec{x}_1^- + \vec{x}_2^-) = U \Sigma_1 V_1^T \vec{x}_1^- \quad (64)$$

The SPP approximating the true GNSS positioning algorithm uses the minimum norm LSA solution (45) because it is unique in $Ker(H)^\perp$. This is called the rank deficient SPP solution and is characterized as follows.

$$\hat{\vec{x}}_1 = \begin{bmatrix} \delta \hat{\vec{r}}_{GNSS1} \\ \delta \hat{T}_1 \end{bmatrix} \quad (65)$$

The components $\delta \hat{\vec{r}}_{GNSS1}$ and $\delta \hat{T}_1$ are respectively used to correct the a priori GNSS position (which is the INS position) and the GNSS clock error. The updated error state that reflects these corrections is $$\vec{x}^+ = \vec{x}^- - \hat{\vec{x}}_1 = \vec{x}_1^+ + \vec{x}_2^- \quad (66)$$

where $$\vec{x}_1^+ = \begin{bmatrix} \delta \vec{r}_{GNSS1}^+ \\ \delta T_1^+ \end{bmatrix} \quad (67)$$

$$= \vec{x}^- - \hat{\vec{x}}_1$$

$$= \begin{bmatrix} \delta \vec{r}_{INS1} \\ \delta T_1^- \end{bmatrix} - \begin{bmatrix} \delta \hat{\vec{r}}_{GNSS1} \\ \delta \hat{T}_1 \end{bmatrix}$$

The minus superscript "−" in equation (66) indicates that $\vec{x}^-$ is an a priori value of $\vec{x}$, which is a best estimate of $\vec{x}$ that the SPP algorithm uses as its starting value. The hat "^" in the vector $\hat{\vec{x}}_1$ in equations (66) and (67) indicates the quantity that the SPP algorithm is able to estimate because it is not in Ker (H). The plus superscript "+" in equation (66) indicates that $\vec{x}^+$ is an a posteriori $\vec{x}$, which is $\vec{x}$ after being corrected by the estimated $\hat{\vec{x}}_1$ generated by the SPP algorithm.

Equation (66) shows that the a priori state component $\vec{x}_2^- \in Ker(H)$ remains unchanged by the position-time error correction.

3.2.3 Observables Subspace Constraint

The AINS Kalman filter uses the corrected GNSS position to construct the IG position measurement (1) and corresponding IG position measurement model (5) and (9). The measurement model assumes the INS and GNSS position errors are statistically uncorrelated so that a Kalman filter update will yield an INS position VCV that is constrained by the IG measurement in all three axes of the Cartesian navigation frame in which $\vec{z}_{IG}$ is constructed.

The residual INS and GNSS errors in the IG position measurement (8) from the rank deficient SPP solution are the following.

$$\vec{z}_{IG} = (\delta \vec{r}_{INS1} + \delta \vec{r}_{INS2}) - (\delta \vec{r}_{GNSS1}^+ + \delta \vec{r}_{INS2}) \quad (68)$$

$$= \delta \vec{r}_{INS1} - \delta \vec{r}_{GNSS1}^+$$

The unobservable position error $\delta \vec{r}_{INS2}$ remains in the updated GNSS position solution and hence cancels in the IG position measurement. The IG measurement thus constrains only $\delta \vec{r}_{INS1}$, and $\delta \vec{r}_{INS2}$ is unconstrained and can grow with time.

The IG position measurement model (5) describes the assumed measurement (8) given by $$\vec{z}_{IG} = \delta \vec{r}_{INS} - \delta \vec{r}_{GNSS} \quad (69)$$

$$= (\delta \vec{r}_{INS1} + \delta \vec{r}_{INS2}) - (\delta \vec{r}_{GNSS1}^+ + \delta \vec{r}_{GNSS2}^+)$$

which assumes the SPP solution is not rank deficient and has computed a statistically independent a posteriori value for $\delta \vec{r}_{GNSS2}^+$. The IG position measurement model (5) does not account for the cancellation of $\delta \vec{r}_{INS2}^-$ in the IG position measurement and the consequent growing INS position error, which causes the AINS Kalman filter's estimated state to become perturbed with a growing bias. Thus the IG position measurement model (5), (9) does not correctly describe the residual INS and GNSS position errors in the measurement (68) when H is column rank deficient. This is a problem brought on by INS position seeding that requires a solution in order for QTC integration to work.

The solution to this problem is the observable subspace constraint (OSC) on the IG position measurement (1) and corresponding IG position measurement model (5), (9). The following two equations comprise the OSC.

The IG position measurement is transformed as follows, $$\tilde{z}_{IG} = \Gamma \vec{z}_{IG} \quad (70)$$

$$= \Gamma(\delta \vec{r}_{INS1} - \delta \vec{r}_{GNSS1}^+)$$

The corresponding IG position measurement model is transformed as follows, $$\tilde{b}_{IG} = \Gamma(A_{IG} \vec{x}_{AINS} + \vec{\eta}_{IG}) \quad (71)$$

The transformed IG position measurement model (71) correctly describes the transformed IG position measurement (70). This is the desired outcome of the OCS.

The OSC requires a 3×3 transformation matrix $\Gamma$ to be determined so that $$\Gamma \delta \vec{r}_{INS2} = 0 \quad (72)$$

(72) states that $\delta \vec{r}_{INS2} \in Ker(\Gamma)$, which in turn implies $\delta \vec{r}_{INS1} \in Ker(\Gamma)^\perp$.

Any $\Gamma$ that fulfills the requirement (72) can be used to implement the OSC given by (70) and (71). There are several different ways of computing a suitable transformation matrix F. The transformation matrix $\Gamma$ that implements the OSC for the preferred embodiment is constructed as follows.

The SVD of $H_d$ given by (26) is used to generate the SVD components $U_d$, $V_d$ and $\Sigma_d$ whose diagonal elements are the singular values of $H_d$. Thus $H_d$ is described in terms of its SVD components as follows:

$$H_d = U_d \Sigma_d V_d^T \quad (73)$$

which becomes the following when $H_d$ is column rank deficient.

$$U_d = [\ U_{d1} \quad U_{d2}\ ] \tag{74}$$

$$V_d = [\ V_{d1} \quad V_{d2}\ ] \tag{75}$$

$$\Sigma_d = \begin{bmatrix} \Sigma_{d1} & 0 \\ 0 & 0 \end{bmatrix} \tag{76}$$

(73) the becomes the following.

$$H_d = [\ U_{d1} \quad U_{d2}\ ] \begin{bmatrix} \Sigma_{d1} & 0 \\ 0 & 0 \end{bmatrix} \begin{bmatrix} V_{d1}^T \\ V_{d2}^T \end{bmatrix} \tag{77}$$

The kernel equivalence property (46) shows that $\vec{x}_2 \in \text{Ker}(H)$ implies $\delta \vec{r}_{INS2} \in \text{Ker}(H_d)$ spanned by the columns of $V_{d2}$. Since $V_{d1}^T \delta \vec{r}_2 = 0$ for any $\delta \vec{r}_2 \in \text{Ker}(H_d)$, $\Gamma = V_{d1}^T$ is a suitable IG measurement transformation that implements the observable subspace constraint when H and hence $H_d$ are column rank deficient. Furthermore this transformation is nonsingular when 4 or more satellites are available and $H_d$ has full column rank. It can therefore be constructed and applied at every epoch, and thereby automatically implement the observable subspace constraint when H is deemed to be column rank deficient.

Column rank deficiency or nearness to column rank deficiency is determined from the singular values of $H_d$ which are the diagonal elements of $\Sigma_d$ in (73). A threshold $d_{max}$ on PDOP is specified to the QTC integration algorithm to indicate that $H_d$ is nearly rank deficient and should be treated as rank deficient if PDOP exceeds the threshold. From (58), this translates to a threshold $c_{min} = 1/d_{max}$ on the singular values of $H_d$.

$\Gamma = V_{d1}^T$ is then assembled as follows using the singular values $c_1, c_2, c_3$ and right singular vectors that are the columns of $V_d$ obtained from the SVD (73).

$$c_i \geq 1/d_{max} \rightarrow \vec{b}2_{di} \in V_{d1} \tag{78}$$

where $\vec{b}2_{di}$ is the right singular vector corresponding to the i-th singular value $c_i$ for i=1, 2, 3. By construction, the largest singular value will pass this test, and hence $V_{d1}$ will contain at least one column. If all singular values equal or exceed $1/d_{max}$, then the $\Gamma = V_{d1}^T$ will be an orthonormal matrix and the IG position measurement vector transformation (71) becomes a rotation. If one or two singular values are smaller than $1/d_{max}$, then $\Gamma = V_{d1}^T$ will have less than 3 rows and so constrain the transformed IG position measurement vector to be in the observable subspace defined by $\text{Ker}(H_d)^\perp$.

The observable subspace constraint (70) and (71) on the IG position measurement in the AINS Kalman filter becomes the following. The transformed IG position measurement is computed every epoch as follows. Let $V_{d1}^T$ be an m×3 matrix assembled from the right singular vectors corresponding to m large singular values equal to or larger than $1/d_{max}$ where m equals 1, 2 or 3. The transformed IG position measurement that the AINS Kalman filter 13 processes comprise the IG position measurement premultiplied by $\Gamma = V_{d1}^T$.

$$\vec{b}4_{IG} = V_{d1}^T \vec{z}_{IG} = V_{d1}^T (\vec{r}_{INS} - \vec{r}_{GNSS}) \tag{79}$$

The corresponding transformed IG position measurement model is the IG position measurement model (5) also premultiplied by $\Gamma = V_{d1}^T$, $$\vec{b}4_{IG} = V_{d1}^T A_{IG} \vec{x}_{AINS} + \vec{b}5_{IG} \tag{80}$$

where $\vec{b}5_{IG}$ is an m-dimensioned vector of uncorrelated white noises with diagonal variance matrix $\tilde{R}_{IG}$. Equations (79) and (80) comprise the OSC for the preferred embodiment.

3.3 Preferred Embodiment Description

This section is concerned with an explicit step-by-step description with words and the flowcharts of the process implemented in the preferred embodiment. This description references equations in the previous sections.

Figure 5:
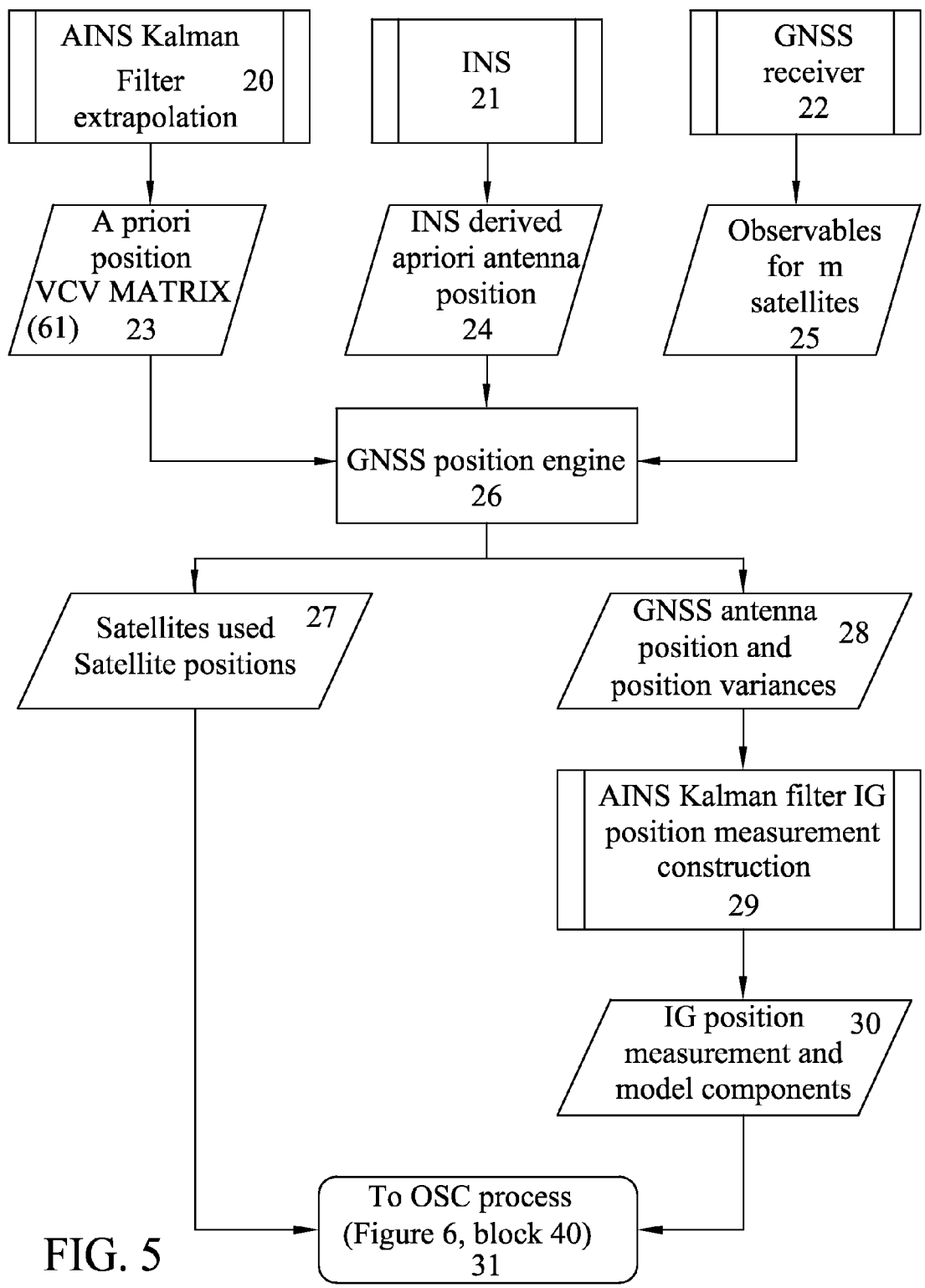
FIG. 5 is a process flow chart that shows the initial and final steps in the QTC process.
Figure 6:
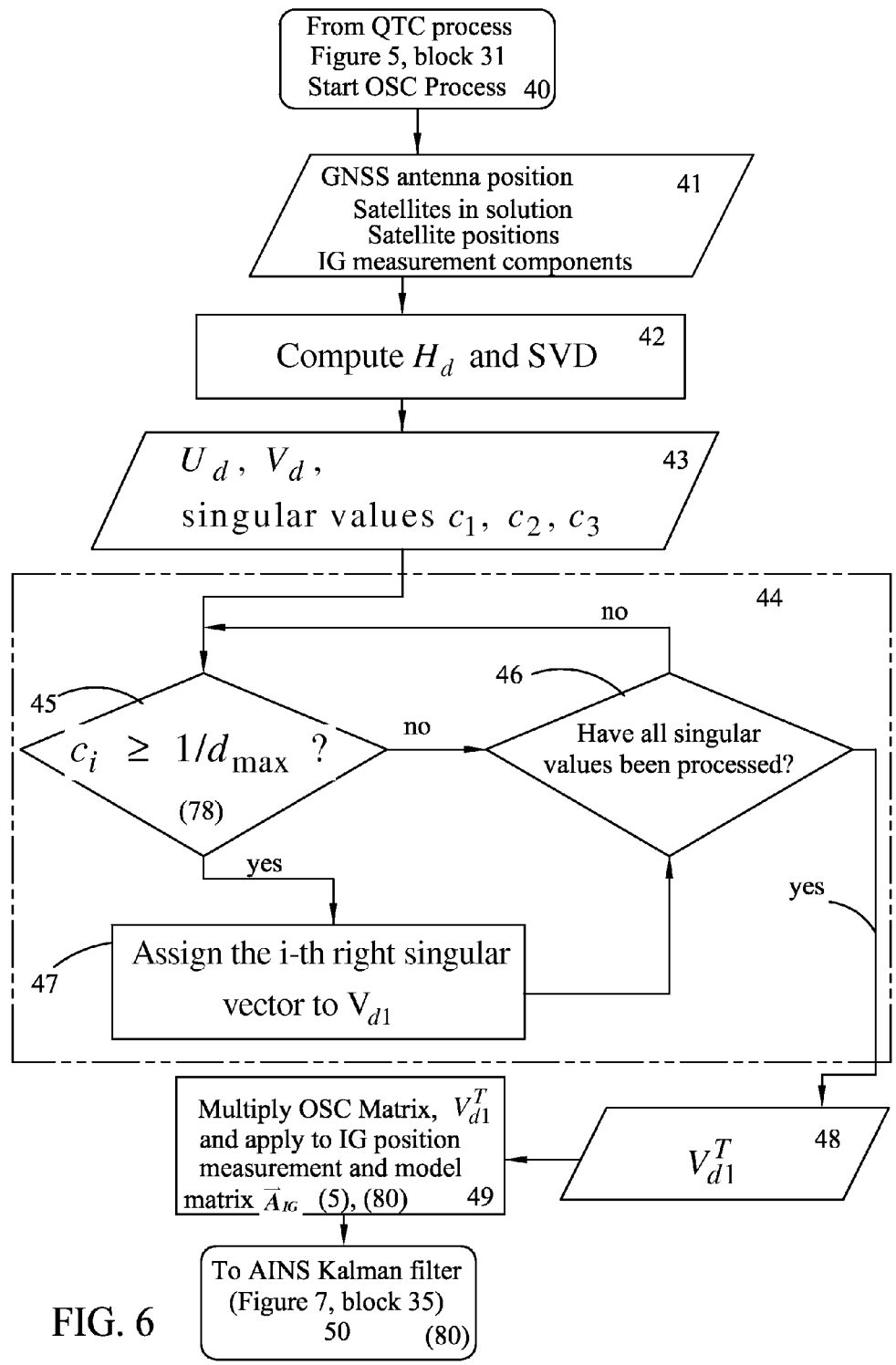
FIG. 6 is a process flow chart that shows the steps in the OSC (Observable subspace constraint) process that extend from FIG. 5.
Figure 7:
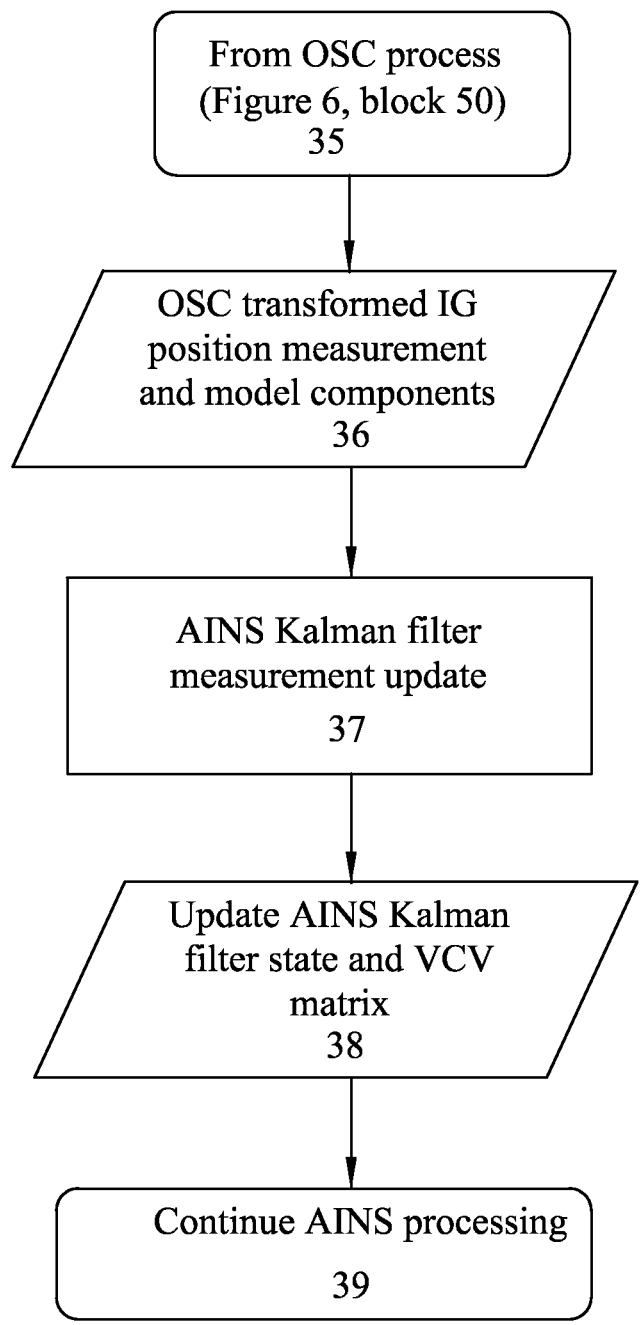
FIG. 7 is a process flow chart that shows the process as the OSC process concludes its steps and exits FIG. 6.

The quasi tightly coupled (QTC) integration process flowcharts shown in FIG. 5 describes the sequence of processing operations in the preferred embodiment. It is part of a closed-loop AINS process such as that described by FIG. 1 or of a feedforward AINS process such as that described by FIG. 2. Consequently FIG. 5 and FIG. 6 show only the steps that are specific to the QTC integration. FIG. 7 shows the AINS Kalman filter measurement update process that uses the output of the QTC integration process among other sources of aiding information.

Referring to FIG. 5, the QTC integration process starts at a given GNSS epoch that corresponds to the AINS Kalman filter epoch. The AINS Kalman filter has, at this point, completed its extrapolation process, represented by block 20, that generates the extrapolated state and a VCV matrix that is valid at the current epoch.

The GNSS position engine, represented by block 26, is designed to do INS position seeding and it receives the following input data required to compute a GNSS position fix:
  GNSS a priori antenna position at block 24 derived from the INS solution at block 21 using equation (60).
  GNSS antenna a priori position VCV block 23 from the AINS Kalman filter extrapolation process block 20 using equation (61) and the
  GNSS observables for m satellites, block 25, from the rover GNSS receiver block 22 and possibly one or more reference receivers (not shown), where m is at least 2 satellites and can be as high as 40 satellites.

The GNSS position engine, block 26, uses the INS-derived a priori antenna position from block 24 and the a priori position VCV matrix from block 23 to do INS position seeding as described in Section 3.2.2 either by setting the INS-derived a priori antenna position from block 24 as the a priori position whose errors the GNSS position engine estimates and corrects, or by setting the INS-derived a priori position VCV matrix from block 23 as a measurement in the GNSS position engine estimation process.

The GNSS position engine at FIG. 5, block 26 outputs the following data:
  List of Satellites used and Satellite positions used in the GNSS position solution and their orbital positions 27
  GNSS antenna position and position variances 28

The parallelogram shape of block 28 data shows that the above two items of data are being transferred from the GNSS position engine 26 process to the following AINS Kalman filter IG position measurement construction process represented by block 29.

The AINS Kalman filter IG position measurement construction process, block 29 then computes the IG position measurement (1) and corresponding measurement model (5), (9) using the GNSS antenna position and position variances, from block 28. The parallelogram shape of block 30 data shows outputs of block 29 are the IG position measurement $\vec{z}_{IG}$ and corresponding measurement model $A_{IG}$. The rounded corner block 3 provides a link between the QTC flowchart of FIG. 5 and the rounded corner block 40 at the top of the OSC flowchart of FIG. 6. The QTC process uses the link to advance from FIG. 5 block 31, to the OSC flowchart in FIG. 6, at block 40.

The OSC process then computes and applies the OSC process to the IG position measurement and measurement model 30 as described by equations (79) and (80) and as shown in the OSC flowchart in FIG. 6.

The OSC process receives the following data items at block 41:
  GNSS antenna position
  Satellites in the position solution
  Positions of the satellites computed from ephemeris data from the GNSS receiver (done as part of the GNSS position fix)
  IG position measurement and measurement model components At the rounded corner block 40 of FIG. 6, the data items listed above are passed to the trapezoidal shaped storage block 41. The OSC process advances to block 42 to construct the satellite differenced range measurement model matrix $H_d$ given by equation (26) using the GNSS antenna position and positions of the satellites used to compute the GNSS position fix. The OSC process then computes the SVD of $H_d$, functions also shown in block 42.

The SVD provides a method for constructing a matrix $V_{d1}$ whose columns form a set of orthonormal basis vectors for the $\text{Ker}(H_d)^\perp$ where, as explained earlier, the upside down "T" superscript "$\perp$" is used to indicate the orthogonal complement, and "Ker" is used to indicate Kernal.

The SVD output data to block 43 comprises matrices $U_d$, $V_d$ and singular values $c_1$, $c_2$, $c_3$ are transferred to trapezoidal block 43 for temporary storage.

The OSC process of FIG. 6 then assembles $V_{d1}$ iteratively in phantom block 44 as follows. $V_{d1}$ starts as an empty matrix having no columns. Then for index i=1, 2, 3 the following actions occur. If the i-th singular value $c_i$ is large according to the test 45 for a specified $d_{max}$ then the corresponding right singular vector $\bar{b}_{2,i}$ in $V_{d1}$ is appended as a new column to $V_{d1}$ in block 47. The assembly of $V_{d1}$ is completed when all three singular values are processed according to the test 46. The output at block 48 of this iterative process is $V_{d1}$ with 1, 2 or 3 columns. In operation, the test process operates on 3 singular values and 3 right singular vectors. The test evaluates each singular value in order to determine if it is large or small.

The $V_{d1}^T$ matrix is a matrix of transposed right singular vectors of the $H_d$ matrix corresponding to large singular values according to the selection test of equation (78), that are used to implement the OSC process. The $V_{d1}$ matrix is an OSC matrix because for any $\bar{x}_2$ in $\text{Ker}(H_d)$, $V_{d1}^T \bar{x}_2 = 0$. The columns of any matrix S obtained by post-multiplying $V_{d1}$ with a non-singular matrix C, i.e. $S = S = V_{d1}C$, will comprise linear combinations of the columns of $V_{d1}$ and hence also span $\text{Ker}(H_d)^\perp$. Then $S = C V_{d1}$ which is the transpose of both sides of $S = V_{d1}C$. Such linear transformations of basis vectors are trivial operations. We therefore can state without loss of generality that $V_{d1}^T$ describes all possible OSC matrices because $S^T = C^T V_{d1}^T$ for any non-singular $C^T$ is an OSC matrix.

The $V_{d1}^T$ matrix is used as the OSC matrix in the preferred embodiment because:
  a) it as orthonormal rows (rows that are orthogonal and have unit length) and
  b) it is generated directly from the SVD output using the row selection algorithm described in the specification.

This is a restatement of the material in the specification using principles of linear algebra.

With 4 or more satellites, $H_d$ has 3 or more rows and hence a column rank of 3. The OSC algorithm constructs the SVD of the $H_d$ matrix and obtains U, V and the singular values in 43 on successive cycles. All singular values are nonzero, and hence $V_{d2}$ is a null matrix. $V_{d1}$ is a 3×3 matrix, and $\Gamma$ (GAMMA)$= V_{d1}^T$ is a 3×3 matrix.

With 3 satellites, $H_d$ has 2 rows and hence a column rank of 2. The OSC algorithm constructs the SVD of $H_d$ and obtains U, V and the singular values. One singular value is zero, and hence $V_{d2}$ is a 3×1 matrix, i.e. a single column with 3 elements. $V_{d1}$ is a 3×2 matrix, and $\Gamma$ (GAMMA)$= V_{d1}^T$ is a 2×3 matrix.

With 2 satellites, $H_d$ has 1 row and hence a column rank of 1. The OSC algorithm constructs the SVD of $H_d$ and obtains U, V and the singular values. Two singular values are zero, and hence $V_{d2}$ is a 3×2 matrix, i.e. two columns with 3 elements. $V_{d1}$ is a 3×1 matrix, and $\Gamma = V_{d1}^T$ is a 1×3 matrix.

With 0 or with 1 satellite, $H_d$ cannot be constructed since there are not enough range measurements to compute single differences. The QTC integration algorithm cannot work in this case.

The OSC process block 49 on FIG. 6 applies the transformation matrix $V_{d1}^T$ to the IG position measurement (1) as described by equation (79) and to the IG position measurement model on FIG. 7 block 45 (5), (9) as described by equation (80) via block 49. The OSC process exits at block 50 and returns control to the AINS Kalman filter in FIG. 7 via block 35. This is also the point at which the process specific to QTC integration ends.

The AINS Kalman filter in FIG. 7 receives the transformed IG position measurement (79) and measurement model (80) as indicated by block 36. The AINS Kalman filter then runs a measurement update via block 37 that processes the IG position measurement along with any other constructed measurements to generate an updated state estimate and estimation VCV matrix as represented by block 38. The AINS Kalman filter exits at block 39 and returns to the main AINS processing algorithm described in FIG. 1 or FIG. 2. The QTC integration process awaits the next AINS Kalman filter epoch to repeat the above processing steps.

If the AINS is a closed-loop AINS as described in FIG. 1, then it uses the updated state estimate and estimation VCV matrix to perform INS error correction as is typical of a closed loop AINS.

If the AINS is a feedforward AINS as described in FIG. 2 then it uses the updated state estimate and estimation VCV matrix to correct the output INS solution as is typical of a feedforward AINS.

3.4 Alternative Embodiments

3.4.1 Alternative Observable Subspace Constraint Transformations

Alternative embodiments may use a different approach to construct the OSC transformation matrix $\Gamma$. The following are possible methods.
  An eigenvalues decomposition of $H_d^T H_d$ by definition yields the singular values and right singular vectors of $H_d$.
  Another alternative is to perform an orthogonalization on the columns of $H_d$.

This process generates a set of orthogonal basis vectors for $\text{Ker}(H_d)^\perp$. Possible methods for this are the Gram-Schmidt algorithm, Hausholder transformation or Givens rotation.

Then assemble the transposed basis vectors as the rows of Γ. This works only for exactly rank deficient $H_d$ when fewer than 4 satellites are used and m<3 since this method does not provide any measure of nearness to rank deficiency.

The Gaussian elimination method reduces a matrix to row echelon form and thereby identifies the linearly independent rows of $H_d$. The kernel of $H_d$ corresponds to the zero rows and its orthogonal complement is spanned by the non-zero rows.

The QR algorithm is a numerically sound alternative to the Gausian elimination method.

APPENDIX 6.0 References 6.1 Literature

[1] George Siouris, Aerospace Avionics Systems, A Modern Synthesis, Academic Press 1993.
[2] A. Lawrence, Modern Inertial Technology, Navigation Guidance and control, Second Edition, Springer 1998.
[3] R. G. Brown and P. Y. C. Hwang, Introduction to Random Signals and Applied Kalman Filtering, $3^{rd}$ Edition, John Wiley & Sons 1997.
[4] R. M. Rogers, Applied Mathematics in Integrated Navigation Systems, AIAA Education Series 2000.
[5] D. J. Biezad, *Integrated Navigation and Guidance Systems*, AIAA Education Series 1999.
[6] P. G. Savage, *Strapdown Analytics, Parts 1 and 2*, Strapdown Associates, 2000.
[7] J. Spilker & B. Parkinson, *Global Positioning System, Theory and Practice Volume I*, AIAA Press.
[8] J. Spilker & B. Parkinson, *Global Positioning System. Theory and Practice Volume II*, AIAA Press.
[9] B. Hofmann-Wellenhof, H. Lichtenegger and J. Collins, *GPS Theory and Practise, $5^{th}$ Edition*, Springer 2001.
[10] D. Lapucha et al., High-Rate Precise Real-Time Positioning Using Differential Carrier Phase, Navigation: Journal of the Institute of Navigation, vol. 43, No. 3, 1996, pp. 1443-1449.
[11] B. Scherzinger, *Precise Robust Positioning with Inertially-Aided RTK*, Journal of the Institute of Navigation, Summer 2006.
[12] Dingshen Chen, *Development of a Fast Ambiguity Search Filtering (FASF) method for GPS carrier phase ambiguity resolution*, UCGE Report 20071, University of Calgary, December 1994.
[13] Paul de Jonge and Christian Tiberius, *The LAMBDA method for integer ambiguity estimation: implementation aspects*, Publications of the Delft Geodetic Computing Centre, No. 12, August 1996.
[14] Numerical Recipes, The Art of Scientific Computing, Third Edition, Cambridge University Press 2007.
[15] P. Teunisson, *A proof of Nielson's Conjecture on the GPS dilution of precision*, IEEE Transactions on Aerospace and Electronic Systems, Vol 34, No. 2, April 1998.

6.2 Acronyms

AINS Aided Inertial Navigation System
DCM Direction Cosine Matrix
DOP Dilution Of Precision
ECEF Earth Centered Earth Fixed (coordinate frame)
GNSS Global Navigation Satellite System
GPS Global Positioning System
HDOP Horizontal (position) Dilution Of Precision
IG INS-GNSS (combination) or INS minus GNSS (position)
IMU Inertial Measurement Unit
INS Inertial Navigation System
KF Kalman Filter
LC Loosely Coupled (GNSS aided INS)
LOS Line Of Sight
LSA Least Squares Adjustment
OSC Observable Subspace Constraint
PDOP Position Dilution Of Precision
QTC Quasi-Tightly Coupled (GNSS aided INS)
SVD Singular Value Decomposition
SPP Single Point Positioning (algorithm or method)
TC Tightly Coupled (GNSS aided INS)
TDOP Time Dilution Of Precision
VCV Variance-Covariance (matrix)
VDOP Vertical (position) Dilution Of Precision 6.3 Coordinate Frames b INS body frame (same as inertial sensor coordinate frame)
e Earth centered earth fixed (ECEF) frame
g Geographic frame (same as NED frame)
NED North-East-Down frame (same as geographic frame)
w INS wander angle navigation frame 6.4 Commonly Used Symbols $\hat{x}$ Hat or carat indicating an estimated value of an unknown scalar, vector or matrix x via some estimation process such as a LSA or Kalman filter.
$\delta x$ Lower case delta indicates the error in a scalar, vector or matrix x.
$\Delta x$ Upper case delta indicates the difference between two samples of a scalar, vector or matrix x.
$x^-$ A priori scalar, vector or matrix x indicates the value of x before subsequent processing or estimation.
$x^+$ A posteriori scalar, vector or matrix x indicates the value of x after processing or estimation.
$\vec{x}^f$ Half arrow and superscript f indicates a vector resolved in coordinate frame f that can be any of the coordinate frames described in the previous section.
$C_f^g$ DCM from frame f to frame g where f and g can be any of the coordinate frames described in the previous section. Thus $C_f^g \vec{x}^f = \vec{x}^g$.
$d_{max}$ User-specified upper bound on acceptable PDOP. Any PDOP larger than this upper bound indicates that $H_d$ is nearly rank deficient and should be treated as if fully rank deficient in the OSC.
H Undifferenced range measurement model matrix (13)
$H_d$ Satellite differenced range measurement model matrix (25)
Ker(H) Kernel or null space of a matrix H
Ker(H)$^\perp$ Orthogonal complement of Ker(H)
$\vec{l}_{ab}^f$ Lever arm vector from device a to device b resolved in coordinate frame f. a and b can be any of the following: s implies INS, g or G implies GNSS. f can be any of the coordinate frames described in the previous section.
$\vec{r}_d^f$ Position vector of device d resolved in coordinate frame f. d can be any of the following: INS or s implies INS, GNSS or g or G implies GNSS. f can be any of the coordinate frames described in the previous section.
$\vec{u}_i^T$ Transposed unit LOS vector from the GNSS antenna to the i-th satellite resolved in an implied coordinate frame.
$V_1$ Matrix of right singular vectors corresponding to non-zero singular values.

$V_2$ Matrix of right singular vectors corresponding to zero or nearly zero singular values.

$V_{d1}^T$ Matrix of transposed right singular vectors of $H_d$ corresponding to large singular values according to the selection test (78), used to implement the OSC.

$\bar{z}_{IG}$ INS minus GNSS position measurement in an AINS Kalman filter

The invention claimed is:

1. A quasi tightly coupled aided INS (QTC AINS) comprising:
   a. an inertial navigator (21) mechanization providing an a priori INS position and attitude solution of the antenna (24),
   b. a loosely-coupled AINS with an AINS Kalman filter (20) that computes an IG position measurement and measurement model and thereby constructs INS-GNSS position measurements and provides an a priori position VCV matrix (23),
   c. a GNSS position engine (26) that computes a GNSS position fix solution, the GNSS position fix solution having an uncorrected component of a GNSS position error due to an insufficient number of satellites, the GNSS position fix solution using observables from a plurality of satellites provided by a GNSS receiver (22, 25) the externally provided a priori antenna position and the a priori position VCV matrix, the GNSS position engine providing a GNSS antenna position and position variance to the AINS Kalman filter, the AINS Kalman filter providing updated IG-GNSS position measurement and measurement model components,
   d. an INS position seeding process in which the externally provided a priori antenna position to the GNSS position engine (26) is an antenna position computed from the INS position and attitude solution,
   e. an observable subspace constraint (OSC) process that
      i. computes an OSC matrix, having rows and having columns, that suppresses the uncorrected component of the GNSS position error in the GNSS position fix solution in the IG-GNSS position measurement constructed by the AINS Kalman filter, and
      ii. multiplies the OSC matrix and the IG position measurement and measurement model to suppress the uncorrected component of the GNSS position error in the IG position measurement and measurement model.

2. The QTC AINS described in claim 1 in which the AINS is a closed-loop configuration in which the AINS Kalman filter provides estimated INS errors from the AINS Kalman filter that are used to correct the inertial navigator mechanization.

3. The QTC AINS described in claim 1 in which the AINS is a feedforward configuration in which the Kalman filter provides estimated INS errors from the AINS Kalman filter that are used to correct the navigation solution output from the inertial navigator mechanization.

4. The QTC AINS described in claim 1 in which the a priori position VCV matrix to the GNSS position engine is computed from the a priori position VCV matrix.

5. The QTC AINS described in claim 1 in which a kernel or null space of the OSC matrix is the kernel or null space of a satellite-differenced range measurement model matrix $H_d$ as given by a satellite differenced range measurement model matrix, as characterized in $$H_d = \begin{bmatrix} -\Delta \bar{u}_1^T \\ \vdots \\ -\Delta \bar{u}_{m-1}^T \end{bmatrix}.$$

6. The QTC AINS described in claim 5 in which the rows of the OSC matrix are transposed right singular vectors corresponding to zero singular values obtained from a singular value decomposition (SVD) of $H_d$ as characterized in $$H_d = \begin{bmatrix} \bar{h}_1^T \\ \bar{h}_2^T \\ \bar{h}_3^T \\ \bar{h}_4^T \end{bmatrix}. \tag{35}$$

7. A quasi tightly coupled (QTC) aided INS (AINS) comprising
   a. an inertial navigator (21) mechanization providing an a priori INS position and attitude solution of an antenna,
   b. a loosely-coupled AINS Kalman filter (20) that computes an IG position measurement and measurement model and thereby constructs INS-GNSS position measurements and provides an a priori position VCV matrix (23),
   c. a GNSS position engine (26) that computes a GNSS position fix solution, the GNSS position fix solution having an uncorrected component of a GNSS position error due to a poor geometry of satellites as viewed from the GNSS position, the GNSS position fix solution from observables from a plurality of satellites provided by a GNSS receiver, the externally provided a priori antenna position and the a priori position VCV matrix,
   d. an INS position seeding process in which the externally provided a priori position to the GNSS position engine is an antenna position computed from the INS position and attitude solution,
   e. an observable subspace constraint (OSC) process that
      i. computes an OSC matrix, having rows and having columns, that suppresses the approximately uncorrected component of the GNSS position error in the GNSS position solution in the IG position measurement constructed by the AINS Kalman filter, and
      ii. multiplies the OSC matrix and the IG position measurement and measurement model to suppress the approximately uncorrected component of the GNSS position error in the IG position measurement and measurement model.

8. The QTC AINS described in claim 7 in which the AINS is a closed-loop configuration in which the AINS Kalman filter provides estimated INS errors that are used to correct the inertial navigator mechanization.

9. The QTC AINS described in claim 7 in which the AINS is a feedforward configuration in which the AINS Kalman filter provides estimated INS errors that are used to correct the navigation solution output from the inertial navigator mechanization.

10. The QTC AINS described in claim 7 in which the a priori position VCV matrix to the GNSS position engine is computed from the AINS Kalman filter a priori position VCV matrix.

11. The QTC AINS described in claim 7 in which the kernel or null space of the OSC matrix is the approximate kernel or null space of a satellite differenced range measurement model matrix $H_d$ when it is close to column rank deficiency as determined by a smallest singular value of $H_d$ being smaller than a specified threshold for nearness to column rank deficiency.

12. The QTC AINS described in claim 11 which $H_d$ is defined to be close to rank deficiency when the dilution of precision (DOP) computed as the square root of the sum of diagonal elements of $(H_d^T H_d)^{-1}$ exceeds a large DOP threshold.

13. The QTC AINS described in claim 12 in which the large singular value threshold for a large singular value is the inverse of the large DOP threshold.

14. The QTC AINS described in claim 11 in which the rows of the OSC matrix are the transposed right singular vectors corresponding to the large singular values obtained from a singular value decomposition (SVD) of $H_d$.

15. The QTC AINS described in claim 11 in which a singular value is defined to be large if it equals or exceeds a large singular value threshold.

16. A quasi tightly coupled GNSS-INS Integration Process (a QTC Process) for use in a GNSS-INS system for constraining the use of GNSS receiver data derived from observables from m satellites, as the receiver data quality falls to a marginal quality, the QTC process selectively constrains the use of GNSS receiver data to data having a quality that is equal to that which exceeds a predetermined threshold, the QTC process comprising:

a GNSS position engine (26) coupled to receive a-priori position VCV data from an AINS Kalman Filter (20), an a-priori position data from an INS (21), and observables from m satellites via a GNSS receiver (22), the GNSS position engine (26) implements a GNSS positioning algorithm to compute a GNSS antenna position fix (28) and an estimation variance-covariance (VCV) matrix, an AINS Kalman filter IG position measurement function (29) coupled to the GNSS position engine to calculate and receive the GNSS antenna position fix (28) and an estimation variance-covariance (VCV matrix) to construct an INS-GNSS (IG) position measurement difference $\bar{z}_{IG}$ data matrix and a measurement model data matrix $H_{IG}$ (30) and transfers the INS-GNSS (IG) position measurement difference $\bar{z}_{IG}$ data matrix and a measurement model data matrix $H_{IG}$ to an OSC process (31), the OSC process uses the INS-GNSS (IG) position measurement difference $\bar{z}_{IG}$ data matrix and a measurement model data matrix $H_{IG}$ to compute the satellite differenced range measurement model matrix $H_d$, and an SVD of the $H_d$ matrix (41), an OSC constraint test process (47) then uses a portion of the SVD to determine if a number of observables from the m satellites were equal to or greater than a predetermined limit for acceptable quality, the constraint test process allowing the use of GNSS receiver data received within an epoch subject to the GNSS receiver data that is to be used being equal to or exceeding a predetermined quality test limit.

* * * * *